United States Patent
Petit et al.

(10) Patent No.: US 11,651,692 B2
(45) Date of Patent: May 16, 2023

(54) PRESENTING RELEVANT WARNINGS TO A VEHICLE OPERATOR

(71) Applicant: QUALCOMM Incorporated, San Diego, CA (US)

(72) Inventors: Jonathan Petit, Wenham, MA (US); Sumant Paranjpe, San Diego, CA (US); Jean-Philippe Monteuuis, Shrewsbury, MA (US); Mohammad Raashid Ansari, Lowell, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/496,691

(22) Filed: Oct. 7, 2021

(65) Prior Publication Data
US 2023/0111436 A1   Apr. 13, 2023

(51) Int. Cl.
*G08G 1/16* (2006.01)
*H04W 4/40* (2018.01)
*B60K 35/00* (2006.01)

(52) U.S. Cl.
CPC ............. *G08G 1/161* (2013.01); *B60K 35/00* (2013.01); *G08G 1/167* (2013.01); *H04W 4/40* (2018.02);
(Continued)

(58) Field of Classification Search
CPC ......... G08G 1/161; G08G 1/167; H04W 4/40; B60K 35/00; B60K 2370/149; B60K 2370/152; B60K 2370/178
See application file for complete search history.

(56) References Cited

U.S. PATENT DOCUMENTS

| 6,553,130 B1 * | 4/2003 | Lemelson | G08G 1/166 |
| | | | 382/104 |
| 10,140,868 B1 | 11/2018 | Lei et al. | |

(Continued)

FOREIGN PATENT DOCUMENTS

| CN | 102826065 A | * | 12/2012 |
| CN | 114093186 A | * | 2/2022 |

(Continued)

OTHER PUBLICATIONS

International Search Report and Written Opinion—PCT/US2022/038338—ISA/EPO—dated Nov. 22, 2022.

*Primary Examiner* — Chico A Foxx
(74) *Attorney, Agent, or Firm* — The Marbury Law Group, PLLC

(57) ABSTRACT

Embodiments include systems and methods executed by a processor of a vehicle for presenting relevant warnings to a vehicle operator, including receiving a vehicle-to-everything (V2X) communication including information regarding a V2X-identified threat, determining whether the vehicle operator has not recognized the V2X-identified threat, determining a display location that is most likely to receive the vehicle operator's attention in response to determining that the vehicle operator has not recognized the V2X-identified threat, and generating an alert regarding the V2X-identified threat on the determined display location. The generated alert regarding the V2X-identified threat on the determined display location may exclude alerts regarding any threat conditions that the processor has determined that the vehicle operator has recognized.

30 Claims, 9 Drawing Sheets

(52) U.S. Cl.
CPC .. *B60K 2370/149* (2019.05); *B60K 2370/152* (2019.05); *B60K 2370/178* (2019.05)

(56) References Cited

U.S. PATENT DOCUMENTS

| | | | |
|---|---|---|---|
| 11,309,983 B2* | 4/2022 | Thagadur Shivappa | ................... G01S 19/48 |
| 11,524,627 B2* | 12/2022 | Shmueli Friedland | ...................... G08G 1/0112 |
| 2008/0309616 A1* | 12/2008 | Massengill | ............. A61B 5/16 345/156 |
| 2010/0253540 A1* | 10/2010 | Seder | ................. G01S 13/867 348/148 |
| 2010/0253594 A1 | 10/2010 | Szczerba et al. | |
| 2011/0169625 A1 | 7/2011 | James et al. | |
| 2012/0016581 A1* | 1/2012 | Mochizuki | ............. G08G 1/167 701/301 |
| 2012/0268262 A1 | 10/2012 | Popovic | |
| 2017/0036674 A1* | 2/2017 | Izuhara | ................. B60W 50/14 |
| 2017/0076605 A1* | 3/2017 | Suzuki | .................. G08G 1/133 |
| 2017/0185146 A1* | 6/2017 | Groh | ......................... B60R 1/00 |
| 2017/0278398 A1* | 9/2017 | Kato | ....................... G08G 1/166 |
| 2018/0170257 A1* | 6/2018 | Ohta | ....................... B60Q 9/008 |
| 2019/0308554 A1 | 10/2019 | Tsukao et al. | |
| 2019/0325751 A1* | 10/2019 | Altintas | ............... G05D 1/0077 |
| 2019/0367050 A1 | 12/2019 | Victor | |
| 2019/0377534 A1* | 12/2019 | Singh | ....................... B60Q 9/00 |
| 2020/0062173 A1* | 2/2020 | Miyahara | ............... G09G 3/001 |
| 2020/0183002 A1* | 6/2020 | Lee | ......................... G01S 13/86 |
| 2020/0204966 A1* | 6/2020 | Thagadur Shivappa | ................... G01S 19/51 |
| 2020/0247318 A1* | 8/2020 | Yamamuro | ..... B60W 30/18159 |
| 2020/0307622 A1 | 10/2020 | Pomish | |
| 2020/0349843 A1* | 11/2020 | Liu | ....................... G08G 1/005 |
| 2021/0065551 A1 | 3/2021 | Manohar et al. | |
| 2022/0063496 A1* | 3/2022 | Matsumura | ........... B60W 50/14 |
| 2022/0080888 A1* | 3/2022 | Hayashi | ................. B60Q 9/008 |

FOREIGN PATENT DOCUMENTS

| | | | | |
|---|---|---|---|---|
| GB | 2566611 B | * | 10/2019 | ............ B60K 35/00 |
| KR | 2012051531 A | * | 5/2012 | |
| KR | 20180003741 A | | 1/2018 | |

* cited by examiner

PRESENTING RELEVANT WARNINGS TO A VEHICLE OPERATOR

BACKGROUND

Intelligent Transportation Systems (ITS) aim to provide services relating to different modes of transport and improve road safety, traffic efficiency, and energy savings. ITS networks include advanced telematics and hybrid communications including Internet Protocol (IP)-based communications as well as Ad-Hoc direct communication among vehicles, infrastructure, and even individuals carrying wireless devices configured for such communications. Also, ITS networks enable more specific types of communication, such as V2I vehicle-to-infrastructure (V2I), vehicle-to-network (V2N), vehicle-to-vehicle(V2V), vehicle-to-pedestrian (V2P), vehicle-to-device (V2D), and vehicle-to-grid (V2g), which are all collectively referred to as vehicle-to-everything (V2X) communications.

Vehicles equipped with V2X technology receive messages from neighboring entities, including roadside units, vehicles, individuals carrying a wireless device. V2X onboard equipment may analyze and use information from received messages improving vehicle safe operations. When appropriate, V2X onboard equipment may warn the operator of the vehicle about safety-critical events or conditions that could present threats to the vehicle or an occupant of the vehicle.

SUMMARY

Various aspects include methods that may be implemented on a processor of a vehicle and systems for implementing the methods for presenting relevant warnings to a vehicle operator responsive to the operator's field of view and field of attention.

Some aspects may include receiving a vehicle-to-everything (V2X) communication including information regarding a V2X-identified threat, determining whether the vehicle operator has recognized the V2X-identified threat, determining a display location that is most likely to receive the vehicle operator's attention in response to determining that the vehicle operator has not recognized the V2X-identified threat, and generating an alert regarding the V2X-identified threat on the determined display location. In some aspects, generating the alert regarding the V2X-identified threat on the determined display location may include generating a display that excludes alerts regarding any threat conditions that the vehicle operator has recognized.

Some aspects may include determining a location of a region outside the vehicle containing the V2X-identified threat, and determining a direction of the vehicle operator's gaze, in which determining whether the vehicle operator has recognized the V2X-identified threat may include determining that the vehicle operator has not recognized the V2X-identified threat in response to determining that the location of the region outside the vehicle containing the V2X-identified threat is not within the field of view of the vehicle operator in the determined direction of the vehicle operator's gaze.

Some aspects may include determining a location of a region outside the vehicle containing the V2X-identified threat, and determining whether the location of the region outside the vehicle containing the V2X-identified threat is in a recognized blind spot of the vehicle operator, in which determining whether the vehicle operator has recognized the V2X-identified threat may include determining that the vehicle operator has not recognized the V2X-identified threat in response to determining that the location of the region outside the vehicle containing the V2X-identified threat is in the recognized blind spot of the vehicle operator.

Some aspects may include determining a direction of the vehicle operator's gaze, in which determining the display location that is most likely to receive the vehicle operator's attention may include determining a display location that is visible within a field of view of the vehicle operator in the determined direction of the vehicle operator's gaze.

In some aspects, determining the display location that is most likely to receive the vehicle operator's attention may include determining which of a plurality of vehicle displays is designated as a preferred display for V2X-identified threats.

Some aspects may include determining whether a threat acknowledgement has been received from the vehicle operator with respect to the V2X-identified threat, in which determining whether the vehicle operator has recognized the V2X-identified threat may include determining that the vehicle operator has not recognized the V2X-identified threat in response to determining that no threat acknowledgement has been received from the vehicle operator with respect to the V2X-identified threat.

Some aspects may include receiving V2X occlusion data indicating a condition exists that reduces a visibility of the V2X-identified threat to the vehicle operator, in which determining whether the vehicle operator has recognized the V2X-identified threat may include determining that the vehicle operator has not recognized the V2X-identified threat in response to receiving the V2X occlusion data.

Some aspects may include increasing a notification priority of the V2X-identified threat in response to determining that the vehicle operator has not recognized the V2X-identified threat, and determining whether the increased notification priority of the V2X-identified threat is a higher priority than other identified threats, in which generating the alert regarding the V2X-identified threat on the determined display location may include generating the alert regarding the V2X-identified threat but excluding alerts regarding other identified threats on the determined display location in response to determining that the increased notification priority of the V2X-identified threat is higher priority than other identified threats.

In some aspects, the V2X communication including the information regarding the V2X-identified threat may be received from a source remote from the vehicle.

Further aspects include a vehicle system including a memory and a processor configured to perform operations of any of the methods summarized above. Further aspects may include a vehicle system having various means for performing functions corresponding to any of the methods summarized above. Further aspects may include a non-transitory processor-readable storage medium having stored thereon processor-executable instructions configured to cause a processor of a vehicle system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
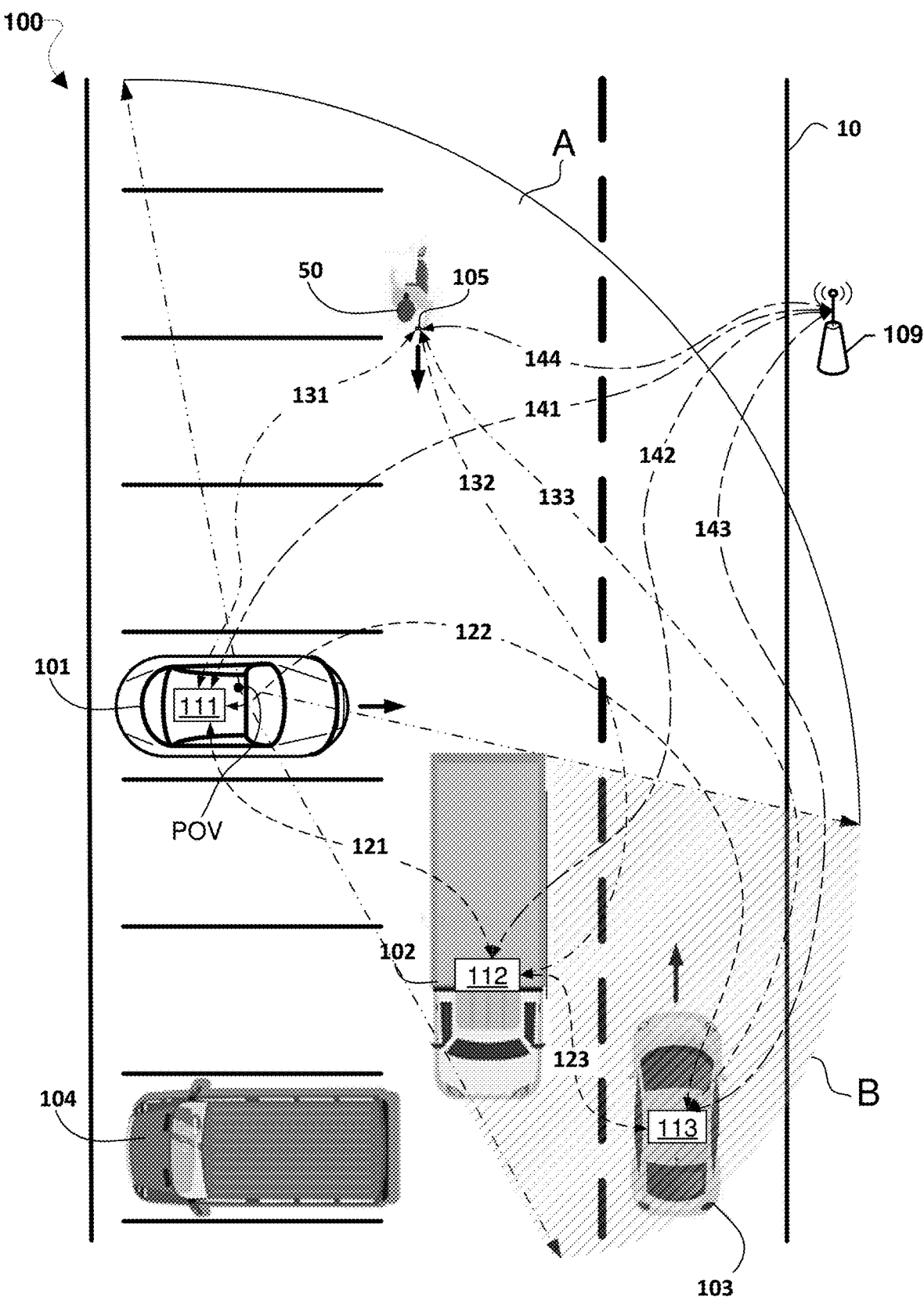
FIG. 1 is a schematic diagrams illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments may leverage elements of V2X warning systems, vehicle interior/occupant monitoring systems (OMS), and in-vehicle sensors to identify and display relevant warnings to a vehicle operator in an appropriate location, such as an in-vehicle display, from among a plurality of vehicle displays, that is most likely to receive the vehicle operator's attention. Various embodiments may calculate obstructed or degraded lines of sight, areas of vehicle operator's perception, and whether threats are recognized by the operator so as to present only relevant warnings in a location and/or manner that is likely to be noticed by the vehicle operator. Further, relevant warning or warnings presented to the vehicle operator may exclude information or warnings regarding threats that the operator has already recognized and/or of low priority. Also, the relevant warning or warnings may be presented only in the selected display location instead of in multiple display locations, which could clutter displays and potentially reduce the likelihood that the operator recognizes and appreciates the warning(s).

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The terms "component," "system," "unit," "module," and the like refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "V2X-identified threat" refers to an event or condition on or near a vehicle that may cause harm or risk of harm to the vehicle, an occupant of the vehicle, or anything on or in the vehicle. In addition, harm or risk to the vehicle may include harm or risk to any extension of the vehicle, such as a towed vehicle, cargo, and/or associated vehicles in a caravan or operating as a platoon.

The term "V2X onboard equipment" refers to equipment onboard a vehicle or device that provides vehicle-to-everything (V2X) functionality. V2X onboard equipment typically includes a processing system that may include one or more processors, SOCs, and/or SIPs, any of which may include one or more components, systems, units, and/or modules that implement the V2X functionality (collectively referred to herein as a "processing system" for conciseness). Aspects of V2X onboard equipment and functionality may be implemented in hardware components, software components, or a combination of hardware and software components.

The term "wireless device" is used herein to refer to any one or all of cellular telephones, smartphones, portable computing devices, tablet computers, smartbooks, wireless electronic mail receivers, multimedia Internet-enabled cellular telephones, wearable devices including smart watches, smart clothing, smart glasses, smart wrist bands, smart jewelry (e.g., smart rings, smart bracelets, etc.), and similar electronic devices that include a memory, wireless communication components and a programmable processor.

A Cooperative-ITS (C-ITS) is under development to improve road safety and pave the way towards the realization of full autonomous driving based on the exchange of information via direct wireless short range communications dedicated to C-ITS and Road Transport and Traffic Telematics (RTTT). Multiple regions of the world are developing standards for vehicle-based communication systems and functionality, including standards developed by the Institute of Electrical and Electronics Engineers (IEEE) and Society of Automotive Engineers (SAE) for use in North America, and by the European Telecommunications Standards Institute (ETSI) and European Committee for Standardization (CEN) for use in Europe. Included in such systems is the ability for a vehicle to broadcast messages that other vehicles can receive and process to improve traffic safety. Such messages are termed Basic Safety Messages (BSM) in North America or Cooperative Awareness Messages (CAM) in Europe (collectively referred to herein as BSM messages for conciseness).

The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-to-vehicle and vehicle-to/from-traffic system wireless communications used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc. Other V2X wireless technologies are also under consideration in different regions of the world. The techniques described herein are applicable to any V2X wireless technology.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X onboard equipment may frequently (e.g. up to 20 times per second) transmit their vehicle information in small messages, such as Basic Safety Messages (BSM) or Cooperative Awareness Message (CAM). With all V2X-enabled vehicles transmitting such BSM/CAM messages, all receiving vehicles have the information required to control their own speed and direction to avoid collisions and efficiently and safely position vehicles with respect to each other.

Current V2X applications use maps, vehicle kinematic state, and vehicle's heading/course to compute and identify safety critical events or conditions in identified areas of relevance. Events and conditions outside those areas of relevance may be ignored for purposes of warning the operator. Defining areas of relevance may be useful to reduce the V2X objects tracked and focus computing power and resources on more appropriate safety-relevant data. However, such areas of relevance do not take into account the actual line-of-sight from the operator's seat or the current operator's gaze direction. Thus, such systems often warn the operator of threats to the vehicle or its occupants, of which the operator is already aware. Repeated warnings that can be ignored can lead to operators being desensitized to warnings, which can diminish the benefit of such a warning system. Also, a warning system that often generates needless warnings may cause user annoyance and/or fatigue.

Various embodiments include methods and systems configured to perform the methods for presenting relevant warnings to a vehicle operator in a manner configured to increase the likelihood that the operator will perceive and process such warnings. In various embodiments, a vehicle processing system (e.g., V2X onboard equipment) may receive a V2X communication including information regarding a V2X-identified threat to the vehicle or a vehicle occupant. The received V2X communication, including information regarding a V2X-identified threat, may come from onboard systems, V2X infrastructure, other vehicles, other external systems, etc. The vehicle processing system may evaluate a plurality of factors relevant to determining whether the V2X-identified threat poses a true threat to the vehicle or passengers in response to receiving the message. The vehicle processing system may evaluate information from various vehicle sensors to determine whether the vehicle operator has recognized the V2X-identified threat or not. Threats that the operator has recognized may not justify a warning, but the operator may need to be warned about unrecognized V2X-identified threats. In various embodiments, the processing system of the vehicle may evaluate inputs from the vehicle OMS and in-vehicle sensors or equipment settings to identify explicit and/or implicit indications regarding whether the operator has recognized the V2X-identified threat.

The vehicle processing system may determine a display location that is most likely to receive the vehicle operator's attention in response to determining that the vehicle operator has not recognized the V2X-identified threat. Vehicles may have large heads-up display capabilities, such as encompassing much if not all of the windshield, as well as multiple displays, such as heads-up displays on side windows and/or multiple different displays on the dashboard. Further, an operator may be wearing a head-mounted display (HMD) providing augmented reality displays of vehicle information overlayed on views of the inside and outside of the vehicle where the user is looking. To increase the likelihood that the operator sees and perceives a threat warning message or alert, the processing system may determine where the operator is looking and identify that a display location that lies within the operator's line of sight on which to present a visible warning about the V2X-identified threat. For example, although a threat like an oncoming vehicle is approaching from the operator's right side, if the operator is currently gazing to the left side of the vehicle, the vehicle processing system may render a warning message on a vehicle display location (e.g., a portion of a large display or a display that is located) on the operator's left side. In vehicles equipped with large displays (e.g., a HUD that encompasses the windshield), the display location for presenting an alert message determined by the vehicle processing system may be a portion of the display aligned with the operator's current line of sight. In such vehicles, the vehicle processing system may move the alert message across the large display as the operator moves his/her eyes and head (i.e., the display location may change in response to operator eye/head movements). In vehicles equipped with a plurality of displays (e.g., a small HUD, a dashboard display, and side panel displays), the determined display location may be one of the plurality of displays that is most closely aligned with the operator's current line of sight. In such vehicles, the vehicle processing system may move the alert message from one display to another as the operator moves his/her eyes and head (i.e., the display selected to present the alert message may change in response to operator eye/head movements). In some embodiments suitable for vehicles that include a display dedicated to or preferred for displaying V2X-related alerts, determining the display location that is most likely to receive the vehicle operator's attention may involve selectin the one of a plurality of vehicle displays that is designated as a preferred display for V2X-identified threats.

The processing system may then generate an alert regarding the V2X-identified threat and render the alert on the determined display location in a manner that improves the likelihood that the operator both sees and processes the alert message. To avoid overloading the operator with information that is of less importance to the operator, the vehicle processing system may generate an alert display that includes only the most relevant or highest priority information, which may include consideration of whether the operator is (or is likely) aware of some threats. In some embodiments, the processing system may generate the alert regarding the V2X-identified threat that excludes alerts regarding any threat conditions that the vehicle operator has already recognized or can see. For example, as the vehicle processing system determines that particular threats have been recognized by the operator, the generated alert message may delete information to the recognized threats. As another example, if there are threats posed by objects or oncoming vehicles on both the operator's right and left sides, the vehicle processing system may render a warning message on a vehicle display location (e.g., a portion of a large display or a display that is located) on the operator's left side that may include only the threat on the operator's right side as the operator can see threats on the operator's left side. In some embodiments, the processing system may evaluate information related to the operator's attention to determine whether the operator has actually recognized threats in the direction the operator is looking before excluding warning messages from the warning presented on the determined display location. Further, the relevant warning or warnings may be presented only in the selected display location (i.e., where the operator is looking), avoiding repeating the warning or warning on multiple displays or display locations, which could potentially reduce the likelihood that the operator recognizes and appreciates the warning(s).

Various embodiments may improve the safety and effectiveness of vehicle safety systems presenting useful warnings to the operator of a V2X equipped vehicle in a display location where the operator is looking and avoiding rendering unnecessary warnings that could lead to operator annoyance or unnecessary warning fatigue. Thus, various embodiments improve the safety and effectiveness of vehicle safety systems by increasing the likelihood that operators will perceive and react to threat warnings.

FIG. 1 is a schematic diagram illustrating an example V2X system 100 suitable for implementing various embodiments. With reference to FIG. 1, vehicles 101, 102, 103 may include V2X onboard equipment 111, 112, 113, respectively, that may be configured to establish wireless communication links 121, 122, 123 between one another. Similarly, pedestrian 50 may be carrying a wireless device 105 also equipped with V2X onboard equipment, which may also be configured establish wireless communication links 131, 132, 133 with the V2X enabled vehicles 101, 102, 103. Additionally, one or more roadside unit(s) 109 may also be equipped with V2X onboard equipment, which may be configured to establish wireless communication links 141, 142, 143, 144 with the vehicles 101, 102, 103 and the wireless device 105. Those wireless communication links 121, 122, 123, 131, 132, 133, 141, 142, 143, 144 may be configured to periodically carry basic safety messages (BSMs) or other V2X communication broadcast between the vehicles 101, 102, 103, the wireless device 104, and/or the roadside unit(s) 109. In contrast, the vehicle 104 may represent other vehicles not equipped with the ability to transmit or receive V2X messages.

The environment illustrated in FIG. 1 reflects a circumstance in which a vehicle operator of the first vehicle 101, who has a particular point of view (POV) may be able to readily observe the pedestrian 50 and other things located in zone A, but may have an occluded or partially occluded view of things located in the far end of zone B. Under this circumstance, the operator of the first vehicle 101 may not realize that the third vehicle 103, which is located in the occluded portion of zone B, is headed north on the roadway 10. Not being fully informed about the circumstance, the operator of the first vehicle 101 may wrongly believe he is free to pull out into the north-bound traffic, could result in a collision.

By sharing the vehicle/device location, speed, direction, behavior such as velocity, acceleration/deceleration, turning, etc., the vehicles 101, 102, 103 and the pedestrian may maintain safe separation and identify and avoid potential collisions (i.e., threats). For example, the first vehicle 101, which is starting to pull out of the parking space may receive a V2X communication (e.g., BSM, CAM) including information regarding a V2X-identified threat to the vehicle or a vehicle occupant. Any V2X onboard equipment, such as from one or more of the other vehicles 102, 103, the wireless device 105, and/or the roadside unit 109 may transmit and/or relay the V2X communication to the first vehicle 101. Once received, using information contained in or accompanying the V2X communication (i.e., a V2X-identified threat), a processing system of the first vehicle 101 may determine the location and trajectory of the third vehicle 103. Thereafter, the first vehicle 101 may generate an alert informing the operator of the impending danger of collision with the third vehicle 103. Such an alert may enable the operator of the first vehicle 101 to remain in the parking space a bit longer (e.g., until at least the third vehicle 103 has passed) and avoid collision.

Additionally, included in the received V2X message or as part of a separate V2X message the V2X onboard equipment 111 within the first vehicle 101 may receive information regarding the threat associated with the pedestrian 50, who is walking toward the first vehicle 101. However, unlike the third vehicle 103, which is in the occluded portion of zone B, the pedestrian 50 is walking in plain sight from the POV of the operator of the first vehicle 101. Thus, in accordance with various embodiments, a processing system of the first vehicle 101 may determine the location and trajectory of the pedestrian 50 and determine not to generate an alert regarding that threat because there are indications the vehicle operator has recognized that threat. Namely, the fact that the threat from the pedestrian 50 (i.e., the danger of causing a collision with the pedestrian) is or should be plainly visible to the vehicle operator. For example, OMS and/or internal sensors in the first vehicle 101 may detect a direction of the vehicle operator's gaze (i.e., a current direction in which the vehicle operator is looking, fixedly, vacantly, or otherwise), which a vehicle processor may use to determine that the pedestrian 50 is within the field of view of that direction of the vehicle operator's gaze. A threat being located within a vehicle operator's field of view may be interpreted as an implicit acknowledgement of the threat (i.e., a threat acknowledgement). Alternatively, the vehicle operator may give an explicit threat acknowledgement, such as a gesture, verbal cue, or other system input that indicates to the vehicle processor that the vehicle operator is aware of that threat.

In addition, the vehicles 101, 102, 103, the wireless device 105, and/or the roadside unit 109 may transmit data and information regarding V2X-identified threats and/or other V2X communications to the ITS through a communication network (e.g., V2X, cellular, WiFi, etc.). Elements of the ITS may be configured to communicate with one another through wired or wireless networks to exchanging information, such as details regarding objects and conditions that may cause or be associated with V2X-identified threats.

Figure 2A:
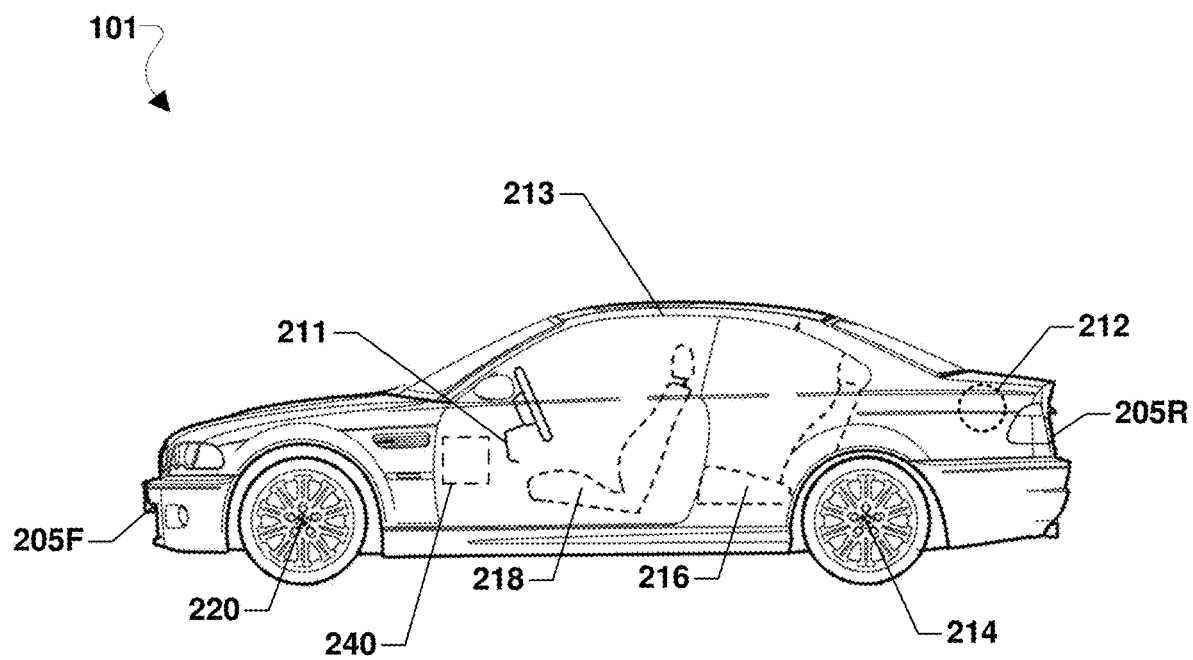
FIGS. 2A and 2B are component block diagrams illustrating a vehicle suitable for implementing various embodiments.
Figure 2B:
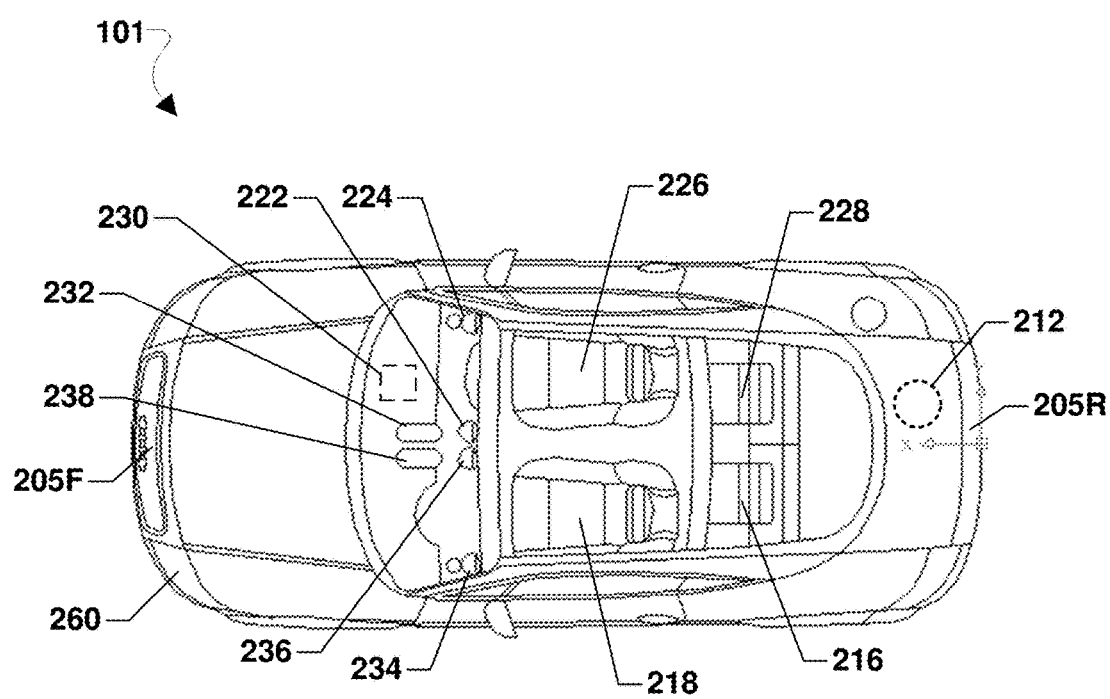

Various embodiments may be implemented within a variety of vehicles, an example vehicle 101 is illustrated in FIGS. 2A and 2B. With reference to FIGS. 1-2B, the vehicle 101 may represent any one or more of the vehicles 101, 102, 103 described with regard to FIG. 1. In various embodiments, the vehicle 101 may include a control unit 240, which may include V2X onboard equipment (e.g., 111) and a plurality of sensors 211-238, including satellite geo-positioning system receivers 213, occupancy sensors 212, 216, 218, 226, 228, tire pressure sensors 214, 220, cameras 222, 236, microphones 224, 234, impact sensors 230, radar 232, and lidar 238. The plurality of sensors 211-238, disposed in or on the vehicle, may be used for various purposes, such as autonomous and semi-autonomous navigation and control, crash avoidance, position determination, etc., as well to provide sensor data regarding objects and people in or on the vehicle 101. The sensors 211-238 may include one or more of a wide variety of sensors capable of detecting a variety of information useful for navigation and collision avoidance. Each of the sensors 211-238 may be in wired or wireless communication with a control unit 240, as well as with each other. In particular, the sensors may include one or more cameras 222, 236 or other optical sensors or photo optic sensors. The sensors may further include other types of object detection and ranging sensors, such as radar 232, lidar 238, IR sensors, and ultrasonic sensors. The sensors may further include tire pressure sensors 214, 220, humidity sensors, temperature sensors, satellite geo-positioning system sensors 213, control input sensors 211, accelerometers, vibration sensors, gyroscopes, gravimeters, impact sensors 230, force meters, stress meters, strain sensors, fluid sensors, chemical sensors, gas content analyzers, pH sensors, radiation sensors, Geiger counters, neutron detectors, biological material sensors, microphones 224, 234, occupancy sensors 212, 216, 218, 226, 228, proximity sensors, and other sensors.

The vehicle control unit 240 may be configured to direct signals from one or both of the narrow-band Wi-Fi emitters 205F, 205R in accordance with various embodiments. Additionally, the control unit 240 may have a default setting for one or both of the narrow-band Wi-Fi emitters 205F, 205R, such as a no-directing setting or a setting that automatically directs one or both of the narrow-band Wi-Fi emitters 205F, 205R to follow the steering wheel. The default setting may be followed when the control unit 240 is not actively directing one or both of the narrow-band Wi-Fi emitters 205F, 205R.

The vehicle control unit 240 may be configured with processor-executable instructions to perform navigation and collision avoidance operations using information received from various sensors, particularly the cameras 222, 236. In some embodiments, the control unit 240 may supplement the processing of camera images using distance and relative position (e.g., relative bearing angle) that may be obtained from radar 232 and/or lidar 238 sensors. The control unit 240 may further be configured to control steering, braking, and speed of the vehicle 101 when operating in an autonomous or semi-autonomous mode using information regarding other vehicles determined using various embodiments.

Figure 2C:
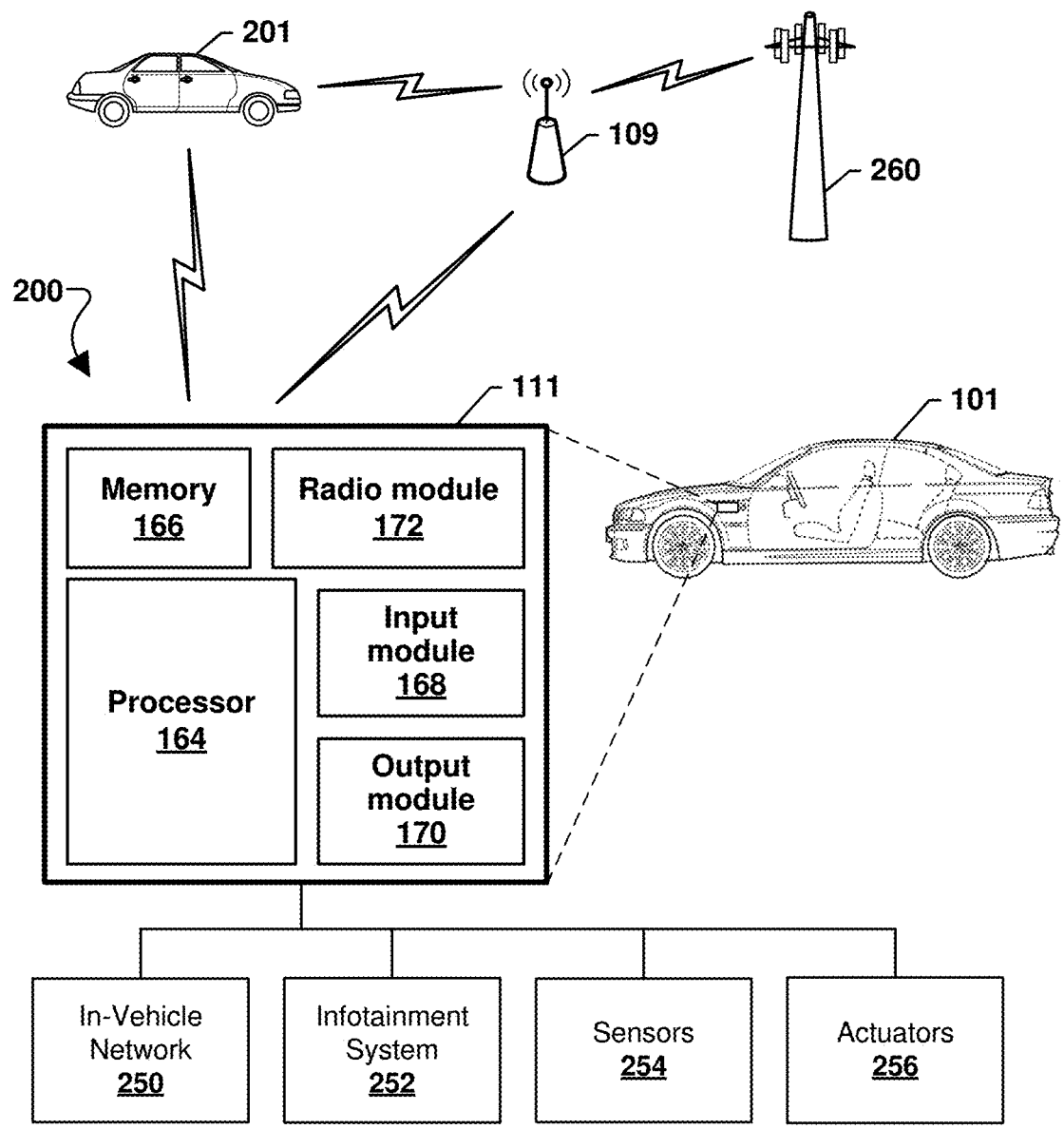
FIG. 2C is a component diagram of an example vehicle system suitable for implementing various embodiments.

FIG. 2C is a component diagram of an example vehicle system 200 suitable for implementing various embodiments. With reference to FIGS. 1-2C, the system 200 may include a vehicle 101 that includes a V2X onboard equipment 111 (for example, a telematics control unit or on-board unit (TCU/OBU). The V2X onboard equipment 111 may communicate with various systems and devices, such as an in-vehicle network 250, an infotainment system 252, various sensors 254, various actuators 256, and a radio frequency (RF) module 172. The V2X onboard equipment 111 also may communicate with various other vehicles 201, roadside units 109, base stations 260, and other external devices. The V2X onboard equipment 111 may be configured to perform operations for presenting relevant warnings to a vehicle operator as further described below.

In the example illustrated in FIG. 2C the V2X onboard equipment 111 includes a processor 164, memory 166, an input module 168, an output module 170 and a radio module 172. The processor 164 that may be configured with processor-executable instructions to control determinations regarding alerts to a vehicle operator of relevant warnings, and optionally maneuvering, navigation, and/or other operations of the vehicle 101, including operations of various embodiments. The processor 164 may be coupled to the memory 166. Also, the processor 164 may be coupled to the output module 170, which may control in-vehicle displays for generating an alert regarding the V2X-identified threat on a determined display location.

The V2X onboard equipment 111 may include a V2X antenna (e.g., an RF module 172), and may be configured to communicate with one or more ITS participants (e.g., stations) such as another vehicle 201, a roadside unit 109, and a base station 260 or another suitable network access point. In various embodiments, the V2X onboard equipment 111 may receive information from a plurality of information sources, such as the in-vehicle network 250, infotainment system 252, various sensors 254, various actuators 256, and the RF module 172. The V2X onboard equipment 111 may be configured to alert a vehicle operator of relevant warnings, as further described below.

Examples of an in-vehicle network 250 include a Controller Area Network (CAN), a Local Interconnect Network (LIN), a network using the FlexRay protocol, a Media Oriented Systems Transport (MOST) network, and an Automotive Ethernet network. Examples of vehicle sensors 254 include a location determining system (such as a Global Navigation Satellite Systems (GNSS) system, a camera, radar, lidar, ultrasonic sensors, infrared sensors, and other suitable sensor devices and systems. Examples of vehicle actuators 256 include various physical control systems such as for steering, brakes, engine operation, lights, directional signals, and the like.

Figure 2D:
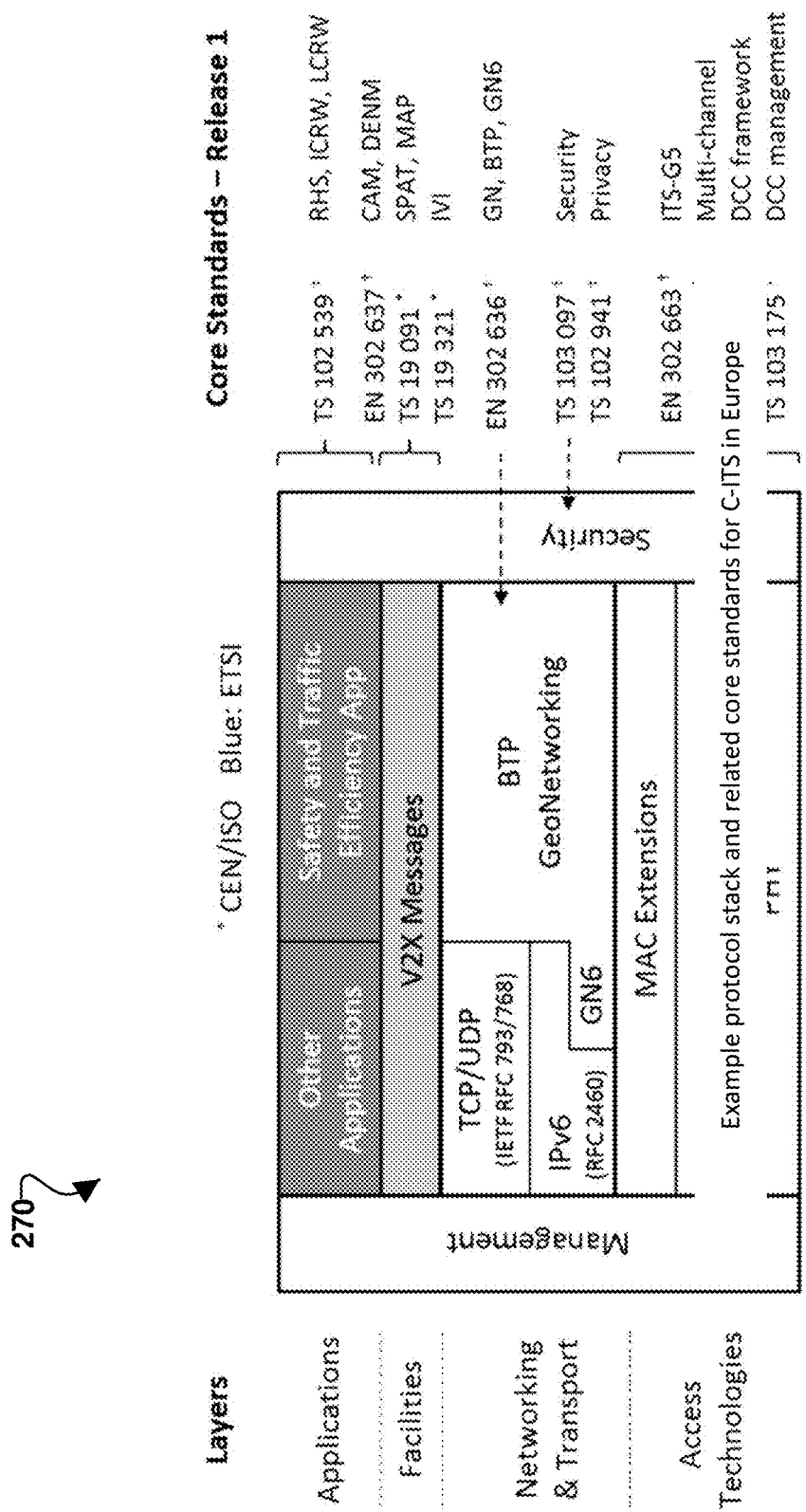
FIG. 2D is a conceptual diagram illustrating an example V2X communication protocol stack suitable for implementing various embodiments.

FIG. 2D is a protocol stack diagram illustrating an example V2X communication protocol stack 270 suitable for implementing various embodiments.

Figure 3A:
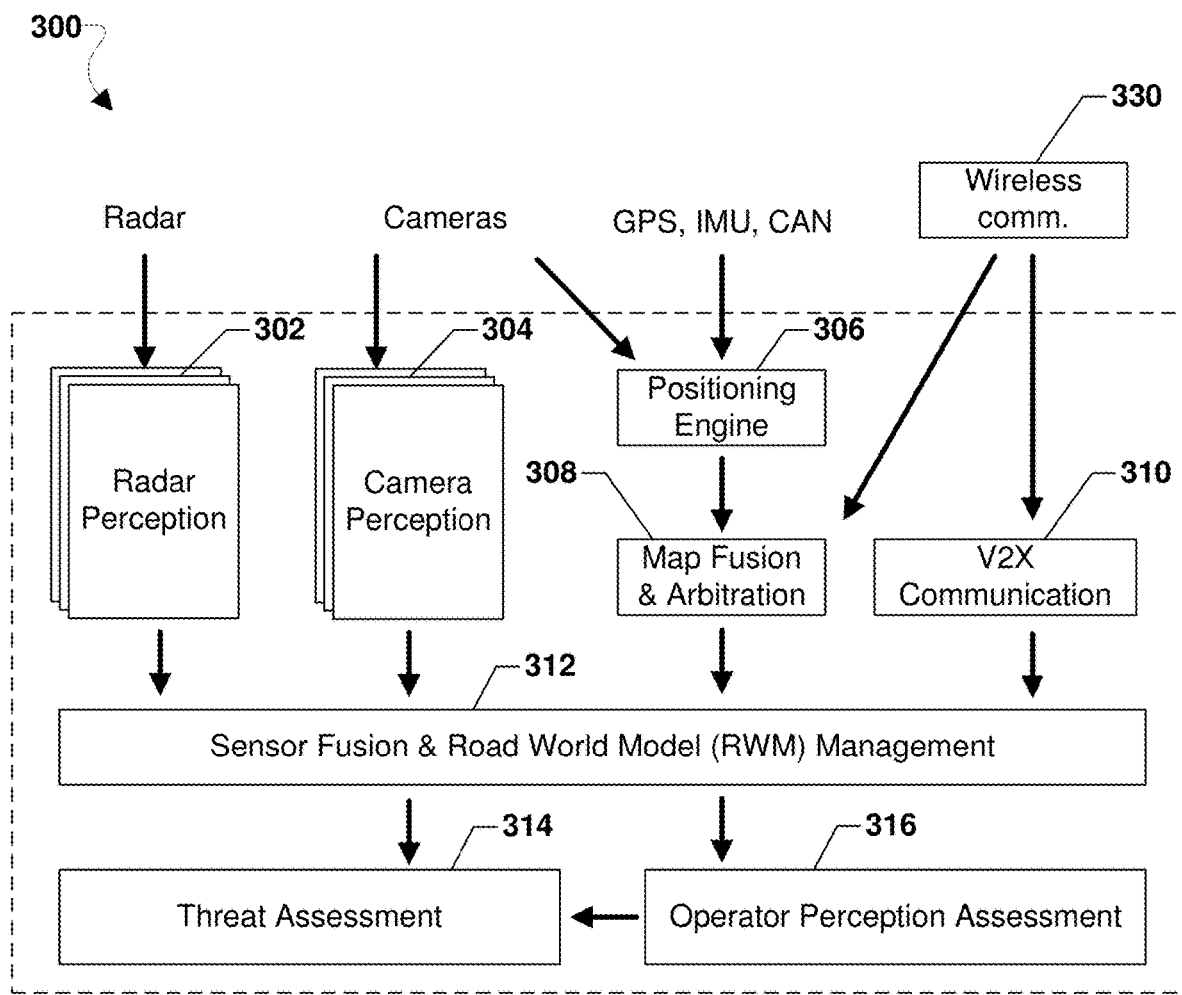
FIG. 3A is a component block diagram illustrating components of an example vehicle management system suitable for implementing various embodiments.

FIG. 3A is a component block diagram illustrating components of an example vehicle threat management system 300. The vehicle threat management system 300 may include various subsystems, communication elements, computational elements, computing devices or units which may be utilized within a vehicle 101. With reference to FIGS. 1-3A, the various computational elements, computing devices or units within the vehicle threat management system 300 may be implemented within a system of interconnected computing devices (i.e., subsystems), that communicate data and commands to each other (e.g., indicated by the arrows in FIG. 3A). In some implementations, the various computational elements, computing devices or units within vehicle threat management system 300 may be implemented within a single computing device, such as separate threads, processes, algorithms or computational elements. Therefore, each subsystem/computational element illustrated in FIG. 3A is also generally referred to herein as "layer" within a computational "stack" that constitutes the vehicle threat management system 300. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle threat management system 300 may include a radar perception layer 302, a camera perception layer 304, a positioning engine layer 306, a map fusion and arbitration layer 308, a V2X communications layer 310, sensor fusion and road world model (RWM) management layer 312, threat assessment layer 314, and operator perception assessment layer 316. The layers 302-316 are merely examples of some layers in one example configuration of the vehicle threat management system 300. In other configurations, other layers may be included, such as additional layers for other perception sensors (e.g., LIDAR perception layer, etc.), additional layers for generating alerts and/or display selection, additional layers for modeling, etc., and/or certain of the layers 302-316 may be excluded from the vehicle threat management system 300. Each of the layers 302-316 may exchange data, computational results and commands as illustrated by the arrows in FIG. 3A. Further, the vehicle threat management system 300 may receive and process data from sensors (e.g., radar, lidar, cameras, inertial measurement units (IMU) etc.), navigation systems (e.g., Global Position System (GPS) receivers, IMUs, etc.), vehicle networks (e.g., Controller Area Network (CAN) bus), and databases in memory (e.g., digital map data). The vehicle threat management system 300 may output alerts and/or commands for generating alerts regarding V2X-identified threats on a select in-vehicle display location. The configuration of the Vehicle threat management system 300 illustrated in FIG. 3A is merely an example configuration and other configurations of a vehicle management system and other vehicle components may be used. As an example, the configuration of the vehicle threat management system 300 illustrated in FIG. 3A may be used in a vehicle configured for autonomous or semi-autonomous operation while a different configuration may be used in a non-autonomous vehicle.

The radar perception layer 302 may receive data from one or more detection and ranging sensors, such as radar (e.g., 132) and/or lidar (e.g., 138), and process the data to recognize and determine locations of other vehicles and objects within a vicinity of the vehicle 101. The radar perception layer 302 may include use of neural network processing and artificial intelligence methods to recognize objects and vehicles, and pass such information on to the sensor fusion and RWM management layer 312.

The camera perception layer 304 may receive data from one or more cameras, such as cameras (e.g., 122, 136), and process the data to recognize and determine locations of other vehicles and objects within a vicinity of the vehicle 100, as well as observations regarding the operator (e.g., a direction of the operator's gaze). The camera perception layer 304 may include use of neural network processing and artificial intelligence methods to recognize objects and vehicles, and pass such information on to the sensor fusion and RWM management layer 312.

The positioning engine layer 306 may receive data from various sensors and process the data to determine a position of the vehicle 101. The various sensors may include, but is not limited to, GPS sensor, an IMU, and/or other sensors connected via a CAN bus. The positioning engine layer 306 may also utilize inputs from one or more cameras, such as cameras (e.g., 122, 136) and/or any other available sensor, such as radars, LIDARs, etc.

The Vehicle threat management system 300 may include or be coupled to a vehicle wireless communication subsystem 330. The wireless communication subsystem 330 may be configured to communicate with other vehicle computing devices and remote V2X communication systems, such as via V2X communications.

The map fusion and arbitration layer 308 may access sensor data received from other V2X system participants and receive output received from the positioning engine layer 306 and process the data to further determine the position of the vehicle 101 within the map, such as location within a lane of traffic, position within a street map, etc. sensor data may be stored in a memory (e.g., memory 166). For example, the map fusion and arbitration layer 308 may convert latitude and longitude information from GPS into locations within a surface map of roads contained in the sensor data. GPS position fixes include errors, so the map fusion and arbitration layer 308 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 308 may determine from the direction of travel that the vehicle is most likely aligned with the travel lane consistent with the direction of travel. The map fusion and arbitration layer 308 may pass map-based location information to the sensor fusion and RWM management layer 312.

The V2X communication layer 310 may receive and utilize sensor data and other inputs from the ITS to collect information about moving objects and conditions near and around the vehicle (e.g., 101). The V2X communications received by the V2X communication layer 310 may provide many types of information. For example, other vehicles or roadside units may provide camera images or sensor reading that may be analyzed (i.e., measuring proximity, motion, trajectory, etc.). The V2X communication layer 310 may pass V2X messaging information to the sensor fusion and RWM management layer 312. However, the use of V2X messaging information by other layers, such as the sensor fusion and RWM management layer 312, etc., is not required. For example, other stacks may control the vehicle (e.g., controlling one or more vehicle displays) without using received V2X messaging information.

In some embodiments, the processor may employ a machine learning process to initially determine, or to refine, detector settings for an ITS participant type. In some embodiments, the processor may provide a plurality of observations of parameters of an ITS participant type to a trained model, such as an ITS participant type model, and may receive as output from the model (e.g., the ITS participant type model) detector settings for one or more detectors that are configured to evaluate an aspect of an ITS participant.

In some embodiments, the processor may store the detector settings for each ITS participant type in a memory that is accessible by the vehicle processing system (for example, by an ITS participant type). In some embodiments, the processor may receive updates via a wireless network (e.g., V2X from a roadside unit (RSU), a 5G network, etc.) from a central source that distributes detector settings and setting updates to some or all ITS participants in a region. Such distributed detector settings or detector setting updates may be provided on the basis of ITS participant type. Detector settings or detector setting updates may be distributed among ITS participants at any level of specificity or granularity, including one or more parameters of a single ITS participant type. For example, an ITS participant processor may receive and store an update indicating a car's maximum plausible speed. In this manner, the detector settings may be received, updated, and/or stored in a compartmentalized manner, for example, individually, and/or by ITS participant type. By enabling detector settings to be received, updated, and/or stored for as little as a single detector setting for an ITS participant type, the detector settings may be more robust against tampering or the introduction of false or spurious settings. For example, an update including a false setting for a car's maximum plausible speed may affect detections related to cars, but will not affect detections related to other ITS participant types (e.g., buses, motorcycles, pedestrians, etc.).

In some embodiments, the processor may determine whether information in the V2X message is plausible or implausible using the detector settings that are based on the ITS participant type. In some embodiments, the processor may determine whether a message is implausible based on whether information in the V2X message meets (e.g., is equal to or exceeds) a maximum or minimum plausible parameter for a detector. In some embodiments, the processor may determine whether a message is plausible or implausible based on the output of a number of detectors. In some embodiments, in response to determining that the information in the V2X message is implausible, the processor may perform a security action. For example, the processor may transmit a misbehavior report about the ITS participant to an ITS network element, such as a security server, or to a network element performing a similar or suitable function.

For ease of reference, some of the embodiments are described in this application with reference to a vehicle using V2X systems and protocols. However, it should be understood that various embodiments encompass any or all of the V2X or vehicle-based communication standards, messages, protocols, and/or technologies. As such, nothing in the application should be construed to limit the claims to a particular system (e.g., V2X) or message or messaging protocol (e.g., Basic Safety Message (BSM)) unless expressly recited as such in the claims. In addition, the embodiments described herein may refer to a V2X processing system in a vehicle. Other embodiments are contemplated in which the V2X processing system may operate in or be included in mobile devices, mobile computers, roadside units (RSUs), and other devices that are equipped to monitor road and vehicle conditions and to participate in V2X communications.

The sensor fusion and RWM management layer 312 may receive data and outputs produced by the radar perception layer 302, camera perception layer 304, map fusion and arbitration layer 308, and V2X communication layer 310, and use some or all of such inputs to estimate or refine the location and state of the vehicle 101 in relation to the road, other vehicles on the road, and other objects or creatures within a vicinity of the vehicle 101. For example, the sensor fusion and RWM management layer 312 may combine imagery data from the camera perception layer 304 with arbitrated map location information from the map fusion and arbitration layer 308 to refine the determined position of the vehicle within a lane of traffic. As another example, the sensor fusion and RWM management layer 312 may combine object recognition and imagery data from the camera perception layer 304 with object detection and ranging data from the radar perception layer 302 to determine and refine the relative position of other vehicles and objects in the vicinity of the vehicle. As another example, the sensor fusion and RWM management layer 312 may receive information from V2X communications (such as via the CAN bus or wireless communication subsystem 330) regarding other vehicle positions and directions of travel, and combine that information with information from the radar perception layer 302 and the camera perception layer 304 to refine the locations and motions of other objects. The sensor fusion and RWM management layer 312 may output refined location and state information of the vehicle 101, as well as refined location and state information of other vehicles and objects in the vicinity of the vehicle, to the threat assessment layer 314 and/or the operator perception assessment layer 316.

As a further example, the sensor fusion and RWM management layer 312 may monitor perception data from various sensors, such as perception data from a radar perception layer 302, camera perception layer 304, other perception layer, etc., and/or data from one or more sensors themselves to analyze conditions in the vehicle sensor data. The sensor fusion and RWM management layer 312 may be configured to detect conditions in the sensor data, such as sensor measurements being at, above, or below a threshold, certain types of sensor measurements occurring, etc., and may output the sensor data as part of the refined location and state information of the vehicle 101 provided to the operator perception assessment layer 316 and/or devices remote from the vehicle 100, such as a data server, other vehicles, etc., via wireless communications, such as through V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., network server 184); and/or owner/operator identification information.

The operator perception assessment layer 316 of the vehicle threat management system 300 may use the refined location and state information of the vehicle 101 and location and state information of other vehicles and objects output from the sensor fusion and RWM management layer 312 to predict future behaviors of other vehicles and/or objects. For example, the operator perception assessment layer 316 may use such information to predict future relative positions of other vehicles in the vicinity of the vehicle based on own vehicle position and velocity and other vehicle positions and velocity. Such predictions may take into account information from the local dynamic map data and route planning to anticipate changes in relative vehicle positions as host and other vehicles follow the roadway. The operator perception assessment layer 316 may output other vehicle and object behavior and location predictions to the threat assessment layer 314. Additionally, the operator perception assessment layer 316 may use object behavior in combination with location predictions to plan and generate control signals for controlling the motion of the vehicle 101. For example, based on route planning information, refined location in the roadway information, and relative locations and motions of other vehicles, the operator perception assessment layer 316 may determine that the vehicle 101 needs to change lanes and accelerate, such as to maintain or achieve minimum spacing from other vehicles, and/or prepare for a turn or exit. As a result, the operator perception assessment layer 316 may calculate or otherwise determine a steering angle for the wheels and a change to the throttle setting to be commanded to the threat assessment layer 314 and vehicle control unit 240 along with such various parameters necessary to effectuate such a lane change and acceleration. One such parameter may be a computed steering wheel command angle.

In some embodiments, the operator perception assessment layer 316 may calculate obstructed (or degraded) line of sight of the operator relative to an identified threat, including V2X-identified threats. Such calculations may be based on inputs received from one or more in-vehicle sensors and/or OMS, which may include inputs detecting operator behavior, posture, movements, etc. In some embodiments, the operator perception assessment layer 316 may calculate areas of perception available to the operator (i.e., available views of the outside world that the operator could see if the operator looked in that direction). In such operations, the operator perception assessment layer 316 may evaluate blind spots, exterior obstructions, and other structures or operator limitations that could block or limit the operator's perceptions in the direction of a threat, as well as identify areas or zone that the operator can see (e.g., potential areas of perception). Further, the operator perception assessment layer 316 may evaluate areas of likely perception based on where the operator has looked in the past few seconds or based on a current direction/angle of the operator's gaze. By comparing whether an identified threat, including V2X threats, falls in an obstructed line of sight or within an area of perception, the operator perception assessment layer 316 may determine whether the operator has likely seen the identified threat. Further, the operator perception assessment layer 316 may evaluate interior sensor data or OMS outputs relevant to operator actions or reactions to determine whether the operator has acknowledged or reacted to the identified threat. For example, the operator perception assessment layer 316 may evaluate whether the operator made an operator action (e.g., touch the brakes, changed throttle level, turned the wheel, etc.) or exhibited a facial change or body movement indicative that the operator has perceived the threat (e.g., focused his/her gaze on the source of the threat, turned his/her head towards the source of the threat, etc.)

The threat assessment layer 314 may receive data and information outputs from the sensor fusion and RWM management layer 312 and other vehicle and object behavior as well as location predictions from the operator perception assessment layer 316, and use this information to plan and generate control signals for controlling the motion of the vehicle 101 and to verify that such control signals meet safety requirements for the vehicle 101. For example, based on route planning information, refined location in the roadway information, and relative locations and motions of other vehicles, the threat assessment layer 314 may verify and generate one or more alerts regarding V2X-identified threats on a determined display location.

In various embodiments, the wireless communication subsystem 330 may communicate with other V2X system participants via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the vehicle threat management system 300 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the operator perception assessment layer 316 (or in a separate layer) may determine the current or future separate distance between another vehicle (as defined by the sensor fusion and RWM management layer 312) and the vehicle (e.g., based on the world model refined by the sensor fusion and RWM management layer 312), compare that separation distance to a safe separation distance parameter stored in memory, and issue instructions to the threat assessment layer 314.

Figure 3B:
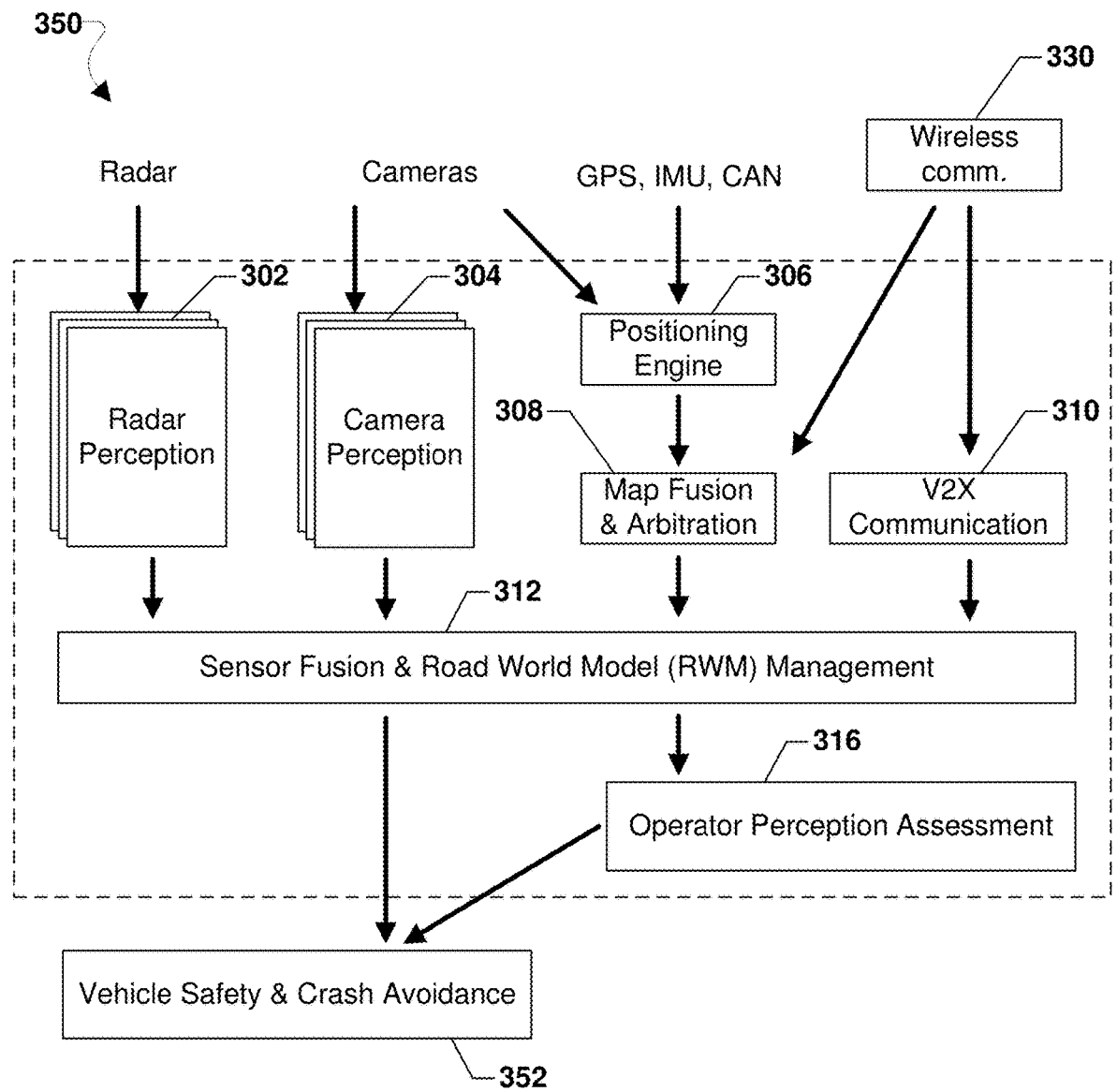
FIG. 3B is a component block diagram illustrating components of another example vehicle management system suitable for implementing various embodiments.

FIG. 3B illustrates an example of subsystems, computational elements, computing devices or units within a vehicle management system 350, which may be utilized within a vehicle 101. With reference to FIGS. 1-3B, in some embodiments, the layers 302, 304, 306, 308, 310, 312, and 316 of the vehicle threat management system 350 may be similar to those described with reference to FIG. 3A and the vehicle threat management system 350 may operate similar to the vehicle threat management system 300, except that the vehicle threat management system 350 may pass various data or instructions to a vehicle safety and crash avoidance system 352. For example, the configuration of the vehicle threat management system 350 and the vehicle safety and crash avoidance system 352 illustrated in FIG. 3B may be used in a non-autonomous vehicle.

In various embodiments, the operator perception assessment layer 316 and/or sensor fusion and RWM management layer 312 may output data to the vehicle safety and crash avoidance system 352. For example, the sensor fusion and RWM management layer 312 may output sensor data as part of refined location and state information of the vehicle 101 provided to the vehicle safety and crash avoidance system 352. The vehicle safety and crash avoidance system 352 may use the refined location and state information of the vehicle 101 to make safety determinations relative to the vehicle 101 and/or occupants thereof. As another example, the operator perception assessment layer 316 may output behavior models and/or predictions related to operator awareness, direction of glance, and/or threat acknowledgements to the vehicle safety and crash avoidance system 352. The vehicle safety and crash avoidance system 352 may use the behavior models and/or predictions to make safety determinations relative to the vehicle 101 and/or occupants thereof In various embodiments, the vehicle safety and crash avoidance system 352 may include functionality that performs safety checks or oversight of various commands, planning, or other decisions of various layers, as well as human operator actions, that could impact vehicle and occupant safety. In some embodiments, a variety of safety parameters may be stored in memory and the vehicle safety and crash avoidance system 352 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 352 may determine the current or future separate distance between another vehicle (as defined by the sensor fusion and RWM management layer 312) and the vehicle (e.g., based on the world model refined by the sensor fusion and RWM management layer 312), compare that separation distance to a safe separation distance parameter stored in memory, and issue instructions to an operator to speed up, slow down or turn if the current or predicted separation distance violates the safe separation distance parameter. As another example, a vehicle safety and crash avoidance system 352 may compare a human operator's change in steering wheel angle to a safe wheel angle limit or parameter, and issue an override command and/or alarm in response to the steering wheel angle exceeding the safe wheel angle limit.

Figure 4A:
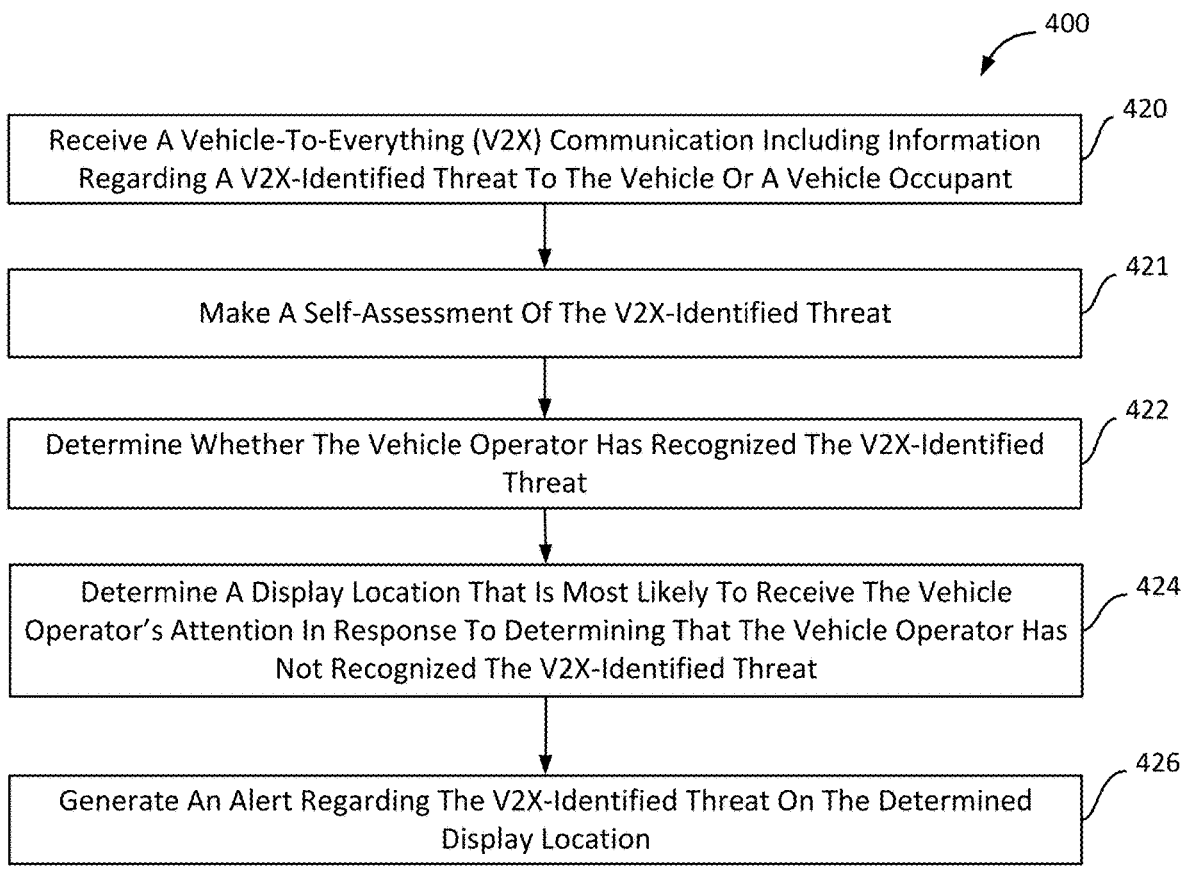
FIG. 4A is a process flow diagram of an example method for presenting relevant warnings to a vehicle operator in accordance with various embodiments

FIG. 4A is a process flow diagram of an example method 400 for presenting relevant warnings to a vehicle operator in accordance with various embodiments. With reference to FIGS. 1-4A, the operations of the method 400 may be performed by a processing system (e.g., 164, 240, 270, 300, 350) of V2X onboard equipment (e.g., 111, 112, 113) of a vehicle (e.g., 101, 102, 103).

In block 421, the processing system may receive a vehicle-to-everything (V2X) communication including information regarding a V2X-identified threat to the vehicle or a vehicle occupant. For example, the received V2X communication may include information regarding a vehicle, object, creature, or condition that may pose a threat to the vehicle or a vehicle occupant (i.e., a V2X-identified threat). The received V2X communication may include information regarding multiple threats to the vehicle or vehicle occupant(s). Such V2X-identified threats may relate to an approaching vehicle, object, or creature; a vehicle, object, creature, or condition the vehicle is approaching, and/or a vehicle, object, creature, or condition that exists within a predetermined proximity of the vehicle. The received V2X communication, including information regarding one or more V2X-identified threats, may come from onboard systems, V2X infrastructure, other vehicles, other external systems, and/or any source or intermediary of V2X communications.

In block 421, in response to receiving the V2X communication, including information regarding a V2X-identified threat, the vehicle may make a self-assessment of the V2X-identified threat. For example, the processing system may have more narrow considerations than the V2X systems that identified and reported the V2X-identified threat.

As part of the operations in block 421, the processing system may evaluate a wide range of factors relevant to the risk posed to the vehicle and/or an occupant thereof when making a self-assessment of the V2X-identified threat. In some embodiments, in block 421 the processing system may evaluate an area classification for an area proximate to or in the general vicinity of the vehicle, such as conditions that could affect vehicle maneuverability, other vehicle/object/creature behavior, and location information of the vehicle (e.g., urban street, parking lot, suburban or sparser building presence, exurban, rural, etc.). In some embodiments, in block 421 the processing system may evaluate a roadway configuration of a roadway area proximate to the vehicle, such as conditions that may affect visibility, vehicle maneuvering, and vehicle behavior. For example, the processing system may evaluate the presence of an intersection, sidewalks, narrow roadways, straight vs. curved roadway, road terrain (e.g., hilly or flat), cross-walks, bike lane, and the like, which may affect the risk posed to the vehicle or occupants, as well as threats that the vehicle could pose to other vehicles, pedestrians, property, animals, etc. In some embodiments, in block 421 the processing system may determine historical risk information for an area proximate to the vehicle, such as whether the area has a history of accidents, types of accidents, and frequency of accidents.

In some embodiments, in block 421 the processing system may evaluate observed behavior of other vehicles, objects, or creatures, such as whether another vehicle is maneuvering erratically, traveling in the subject vehicle's travel lane or on or near the road, traveling on a sidewalk or in a bike lane. In some embodiments, in block 421 the processing system may classify other vehicles, objects, and/or creatures, such as whether the other vehicles, objects, and/or creatures is a car, truck, cyclist, pedestrian, animal, etc.

In some embodiments, in block 421 the processing system may evaluate local weather conditions, such as conditions that may affect visibility, maneuverability, and vehicle handling, including the presence of fog, rain, ice, wet or slippery roads, and the like, as well as sunlight or lighting conditions such as dawn or twilight, night time, daylight, the presence or absence of street lighting at night, and the like.

In some embodiments, in block 421 the processing system may evaluate a plurality of factors to determine a risk score for the risk posed by the vehicle to other vehicles, objects, and/or creatures. In some embodiments, the evaluation of each of the factors may increase or decrease the risk score. In such embodiments, the processing system may determine the risk score as an aggregation of the evaluation of the factors relevant to determining the risk posed to the other vehicles, objects, and/or creatures by the vehicle. In some embodiments, the processing system may associate each of the plurality of factors with a weight factor. In such embodiments, the processing system may determine the risk score as an aggregation of the factors relevant to determining the risk posed to other vehicles, objects, and/or creatures by the vehicle and their assigned weight factors. In some embodiments, the processing system may adjust the weight applied to some factors based on the value or impact of other detected factors, such as increasing a weight associated with some factors when the predicted separation distance between the vehicle and the other vehicles, objects, and/or creatures at a predicted closest point of approach meets or is less than a threshold.

The processing system may evaluate a plurality of factors in a variety of manners when making a self-assessment of the V2X-identified threat in block 421. In some embodiments, the processing system may assign a numerical value to each determined factor, and may tabulate the assigned numerical values to determine the risk score. In some embodiments, the processing system may apply the determined factors to a decision tree configured to produce the risk score as an output. In some embodiments, the processing system may provide the plurality of factors (or numerical values assigned to each of the factors) as inputs to a weighted formula configured to produce the risk score as an output. In some embodiments, the processing system may apply the plurality of factors to a trained neural network model that provides the risk score as an output. Other techniques for evaluating the plurality of factors in block 406 are also possible. In some embodiments, the processing system may determine whether the risk score meets a warning threshold. For example, the processing system may compare the risk score to a threshold value stored in memory. In some embodiments, the threshold value may vary depending upon circumstances, such as the operator of the vehicle, whether the vehicle is operating autonomously, the predicted separation distance between the vehicle and the other vehicles, objects, and/or creatures at a predicted closest point of approach, etc.

Means for performing the operations of block 420 include the processing system(s) 164, 240, 270, 300, 350, the memory 166, the input module 168, the output module 170, the radio module 172, and the threat assessment module 314.

In block 422, the processing system may determine whether or not the vehicle operator has recognized the V2X-identified threat. As part of the operations in block 422, the processing system may evaluate the operator's current field of view, as well as internal and external factors potentially affecting the operator's view of the identified threat.

In some embodiments, determining whether the vehicle operator has recognized the V2X-identified threat may include determining that the vehicle operator has not recognized the V2X-identified threat in response to determining that the location of the region outside the vehicle containing the V2X-identified threat is not within the field of view of the operator's gaze. Thus, if the V2X-identified threat is not visible to the operator because the threatened object (e.g., another vehicle) is located in an area that the operator cannot see, such as if the operator's view of the object is blocked by an external vehicle, object, creature, or condition, etc. In some embodiments, in block 422 the processing system may take into account environmental factors that may obstruct or occlude visibility, such as sunrise, sunset, glare, fog, smog, rain, etc.

In some embodiments, determining whether the vehicle operator has not recognized the V2X-identified threat may include determining that the vehicle operator has not recognized the V2X-identified threat in response to determining that the location of the region outside the vehicle containing the V2X-identified threat is in a recognized blind spot of the vehicle operator. For example, based on the vehicle operator's point of view, vehicle data may identify known vehicle blind spots, which are regions outside the vehicle obstructed to the vehicle operator's view due to vehicle structures or features. As a further example, the processing system may obtain external environmental information, which may identify external elements or factors that may create blind spots, such as a sunset, sunrise, fog, etc. In this way, one or more regions outside the vehicle in which the external element or factor is located may be designated as recognized blind spots of the vehicle operator.

In some embodiments, determining whether the vehicle operator has not recognized the V2X-identified threat may include determining that the vehicle operator has not recognized the V2X-identified threat in response to receiving V2X occlusion data indicating the operator may not be able to see the V2X-identified threat.

In some embodiments, determining whether the vehicle operator has not recognized the V2X-identified threat may include determining that the vehicle operator has not recognized the V2X-identified threat in response to determining that the operator has not reacted in a way that would indicate that the operator has seen and acknowledge the V2X-identified threat.

In some embodiments, in block 422 the processing system may calculate an operator's line of sight and corresponding field of view, taking into account any occlusions or obstructions indicated from V2X communications (i.e., from the remote sensor standpoint), which may provide information about an obstructed object. In addition, the processing system may calculate an operator's line of sight and corresponding field of view, taking into account the operator's perspective of things (e.g., using in-vehicle sensors and/or OMS providing inputs such as seat height). Further the processing system analyze an operator's behavior, to add contextual and/or dynamic data to the analysis, using gaze angle/direction, facial pose, and/or body movement.

Using a combination of all this information, the processing system may calculate areas of true relevance outside the vehicle for threat assessment in block 422. If processing system determines that an identified threat is disposed outside the area(s) of true relevance, then the operator need not be notified about that identified threat.

The determinations made by the processing system in block 422 may be in response to the processing system confirming, through the self-assessment of the V2X-identified threat, that the V2X-identified threat does pose significant risk to the vehicle and/or a vehicle occupant. Means for performing the operations of block 422 include the processing system(s) 164, 240, 270, 300, 350, the memory 166, the input module 168, the output module 170, the radio module 172, the operator perception assessment module 316, and the vehicle safety and crash avoidance module 352.

In block 424, the processing system may determine a display location that is most likely to receive the vehicle operator's attention in response to determining that the vehicle operator has not recognized the V2X-identified threat. In some embodiments suitable for vehicles with large displays, such as a heads-up display encompassing most or all of the windshield, determining the display location that is most likely to receive the vehicle operator's attention may include determining a portion or segment of the large display that is visible in (i.e., in line with) the operator's field of view in the determined direction of the operator's gaze. In some embodiments suitable for vehicles with a plurality of vehicle displays, determining the display location that is most likely to receive the vehicle operator's attention may include determining which of the plurality of vehicle displays is visible within a field of view of the operator in the determined direction of the operator's gaze. For example, although the V2X-identified threat is coming from the operator's right side (see, FIG. 1), if the operator is looking toward the left (i.e., in the opposite direction), a display location located on the left side of the dashboard (e.g., a left side of a full windshield display, on a separate display located on the left side of the dashboard, or on a portion of a HMD augmented reality display) may be selected by the processing system for use in presenting the warning to the operator. In some embodiments, determining the display location that is most likely to receive the vehicle operator's attention may include determining which of a plurality of vehicle displays is designated as a preferred display for V2X-identified threats. In this way, the processing system may calculate the optimal or best available location to display a warning for the operator. Means for performing the operations of block 424 include the processing system(s) 164, 240, 270, 300, 350, the memory 166, the input module 168, the output module 170, the radio module 172, the threat assessment module 314, the operator perception assessment module 316, and the vehicle safety and crash avoidance module 352.

In block 426, the processing system may generate an alert regarding the V2X-identified threat on the determined display location. In some embodiments, the processing system may generate an alert regarding the V2X-identified threat on the determined display location that excludes alerts regarding threat conditions that the vehicle operator has recognized or can see (i.e., that falls within the operator's current field of view and is not occluded). Also in particular embodiments, the relevant warning or warnings may be presented only in the selected display location instead of in multiple display locations, which could clutter displays and potentially reduce the likelihood that the operator recognizes and appreciates the warning(s). In some embodiments, the processing system may generate an alert regarding the V2X-identified threat on the determined display location that includes only the V2X-identified threat on the determined display location in response to determining that the V2X-identified threat has a higher priority than other identified threats. In other words, the processing system may determine that the V2X-identified threat is more significant than another threat and thus generate an alert regarding the V2X-identified threat rather than the other threat. For example, in the circumstance described with regard to the environment in FIG. 1, if the processing system determines that the threat posed by the third vehicle (e.g., 103) is greater than the threat posed by the pedestrian (e.g., 50), the processing system may generate an alert regarding the third vehicle on the determined display location that does not mention the pedestrian. As another example, if the processing system determines that the operator has already seen or recognized the threat posed by the third vehicle (e.g., 103), the processing system may generate an alert regarding the pedestrian (e.g., 50) on the determined display location that does not mention the third vehicle.

Means for performing the operations of block 426 include the processing system(s) 164, 240, 270, 300, 350, the memory 166, the input module 168, the output module 170, the radio module 172, the threat assessment module 314, the operator perception assessment module 316, and the vehicle safety and crash avoidance module 352.

In some embodiments, the processing system may obtain or retrieve a warning threshold from memory. In such embodiments, in response to determining that risk score meets the warning threshold obtained from memory, the processing system may send the warning message to the determined display location.

In some embodiments, the processing system may determine the warning threshold based on information received from one or more sensors and/or the ITS. For example, in a situation in which four vehicles are proximate to the vehicle, the vehicles may communicate information with each other (e.g., via one or more V2X messages) including information such as their locations, distance and direction from the vehicle, etc. In such embodiments, the processing system (e.g., of one or more of the vehicles) may select a warning threshold such that it is statistically likely that one or two of the vehicles will send a warning message to the vehicle rather than all four vehicles sending warning messages.

FIGS. 4B-4G are process flow diagrams of example operations 402, 404, 406, 408, 410, and 412 that may be performed as part of the method 400 for presenting relevant warnings to a vehicle operator in accordance with various embodiments. The operations 402, 404, 406, 408, 410, and 412 may be performed by a processing system (e.g., 164, 240, 270, 300, 350) of V2X onboard equipment (e.g., 111, 112, 113) of a vehicle (e.g., 101, 102, 103).

Figure 4B:
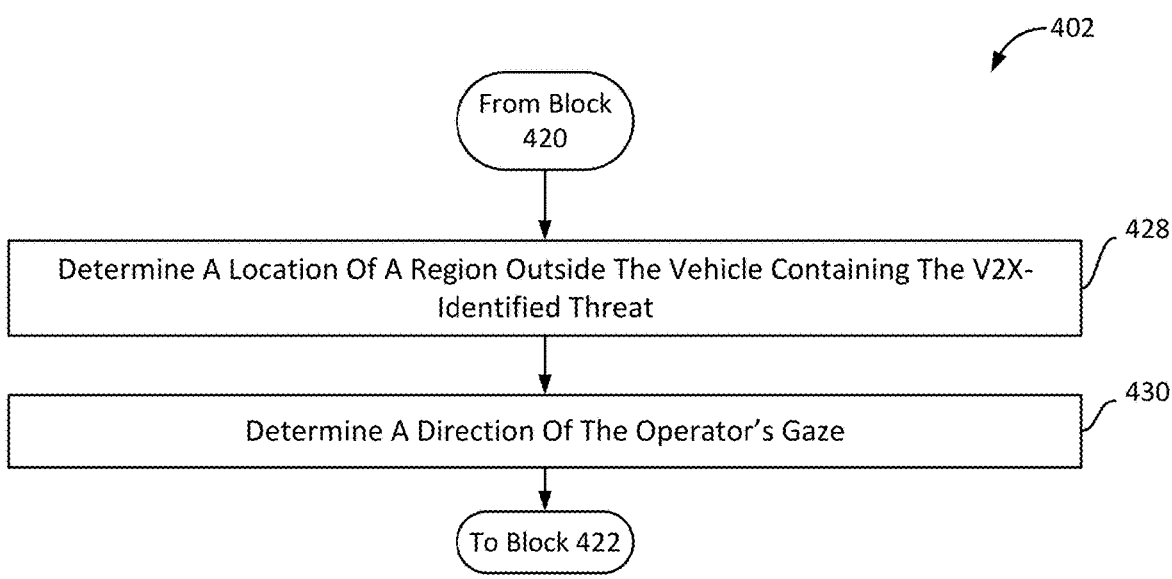
FIGS. 4B, 4C, 4D, 4E, 4F, and 4G are process flow diagrams of example operations that may be performed as part of the method for presenting relevant warnings to a vehicle operator in accordance with various embodiments.

FIG. 4B illustrates operations 402 that may be performed by the processing system in some embodiments for determining a location of a region outside the vehicle containing the V2X-identified threat.

With reference to FIGS. 1-4B, after receiving the V2X communication in block 420 of the method 400, the processing system may determining the location of the region outside the vehicle containing the V2X-identified threat in block 428. For example, the processing system may determine where within the 360 degree radius of the vehicle the V2X-identified threat is located. In addition, the processing system may determine how far away the threat is and how fast it is moving, if applicable, and/or its current trajectory, if applicable. As noted above, the processing system may receive information from a variety of sensors of the vehicle and/or information in the V2X communications. Means for performing the operations of block 428 include the processing system(s) 164, 240, 270, 300, 350, the memory 166, the input module 168, the output module 170, the radio module 172, the threat assessment module 314, and the vehicle safety and crash avoidance module 352.

In block 430, the processing system may determine a direction of the operator's gaze. The processing system may use internal vehicle sensors and/or OMS outputs, including internal cameras, to determine the operator's gaze direction. The processing system may analyze the inputs regarding the operator's gaze, such as head tilt/rotation angle and/or a focal point of the operator's eyes. Means for performing the operations of block 430 include the processing system(s) 164, 240, 270, 300, 350, the memory 166, the input module 168, the output module 170, the radio module 172, the operator perception assessment module 316, and the vehicle safety and crash avoidance module 352. Following the operations in block 430, the processing system may perform the operations in block 422 of the method 400 as described.

Figure 4C:
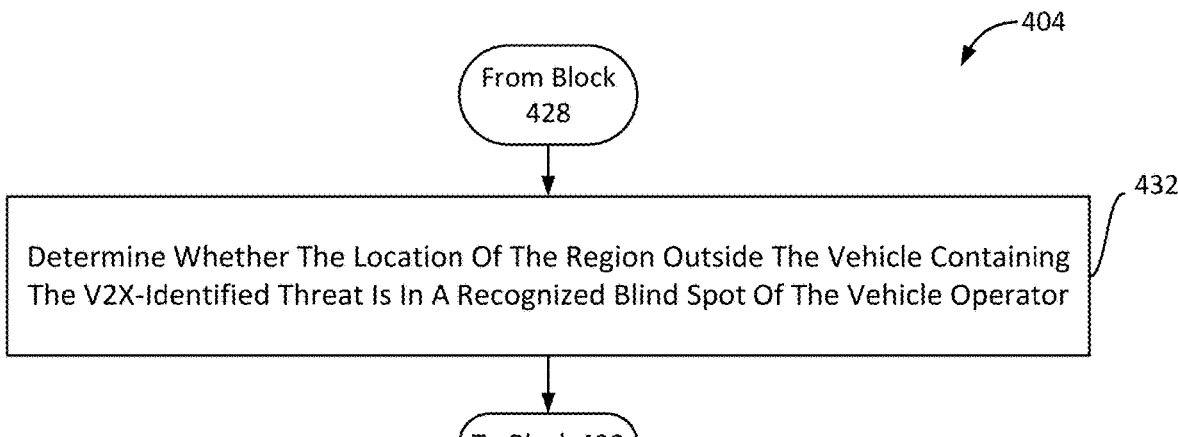

FIG. 4C illustrates operations 406 that may be performed by the processing system in some embodiments. With reference to FIGS. 1-4C, after determining a location of a region outside the vehicle containing the V2X-identified threat (block 428 of the operations 402), the processing system may determine whether the location of the region outside the vehicle containing the V2X-identified threat is in a recognized blind spot of the vehicle operator in block 432. For example, certain regions outside the vehicle may be known to be blocked from view by the operator due to structural column and other vehicle elements that restrict an operator's view. From the operator's point of view (POV), these blocked areas are referred to as blind spots. Means for performing the operations of block 430 include the processing system(s) 164, 240, 270, 300, 350, the memory 166, the input module 168, the output module 170, the radio module 172, the operator perception assessment module 316, and the vehicle safety and crash avoidance module 352. Following the operations in block 432, the processing system may perform the operations in block 422 of the method 400 as described.

Figure 4D:
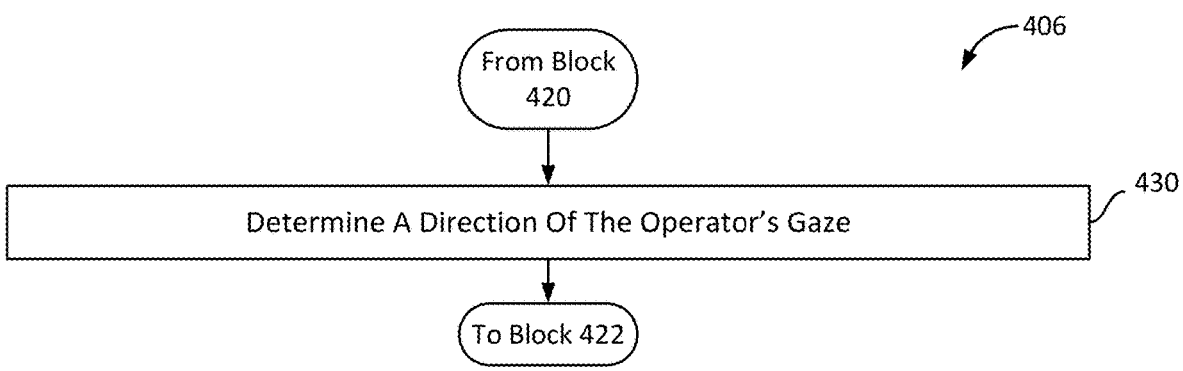

FIG. 4D illustrates operations 406 that may be performed by the processing system in some embodiments. With reference to FIGS. 1-4D, after receiving the V2X communication in block 420, the processing system may determine a direction of the operator's gaze in block 430 as described with reference to the operations 402. Following the operations in block 430, the processing system may perform the operations in block 422 of the method 400 as described.

Figure 4E:
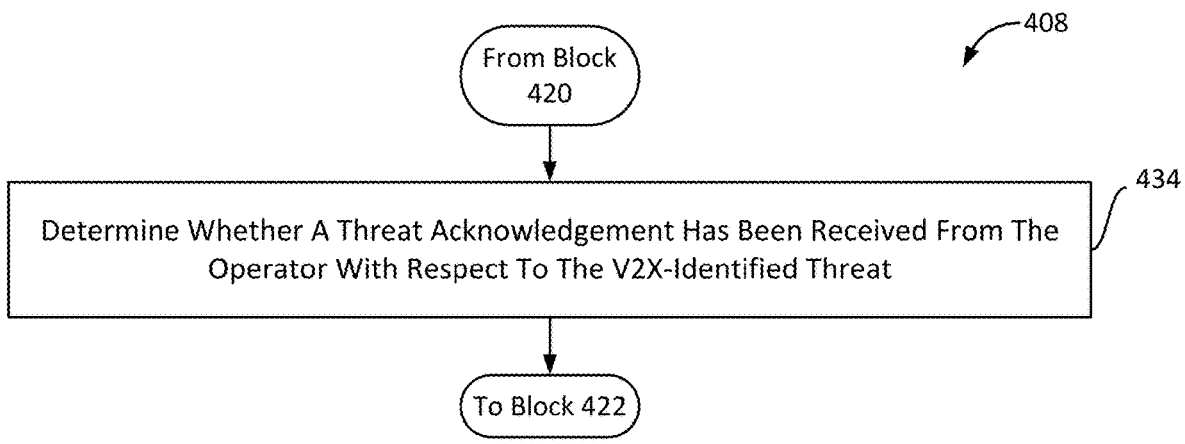

FIG. 4E illustrates operations 408 that may be performed by the processing system in some embodiments. With reference to FIGS. 1-4E, after receiving the V2X communication in block 420, the processing system may determine whether a threat acknowledgement has been received from the operator with respect to the V2X-identified threat in block 434. For example, in some embodiments the threat acknowledgement received from the operator may be an explicit input received from the operator (e.g., verbal input/command, user interface input, user gesture, such as a predetermined blink pattern to confirm acknowledgement). Alternatively, or additionally, in some embodiments the threat acknowledgement received from the operator may be an implied acknowledgment (e.g., pupil dilation, smart glasses observation, attention to direction of the relevant threat, machine-learning detection of user's reaction to the relevant threat, such as learned through training cycle, direction of the gaze of the user, etc.). Means for performing the operations of block 434 include the processing system(s) 164, 240, 270, 300, 350, the memory 166, the input module 168, the output module 170, the radio module 172, the operator perception assessment module 316, and the vehicle safety and crash avoidance module 352. Following the operations in block 434, the processing system may perform the operations in block 422 of the method 400 as described.

Figure 4F:
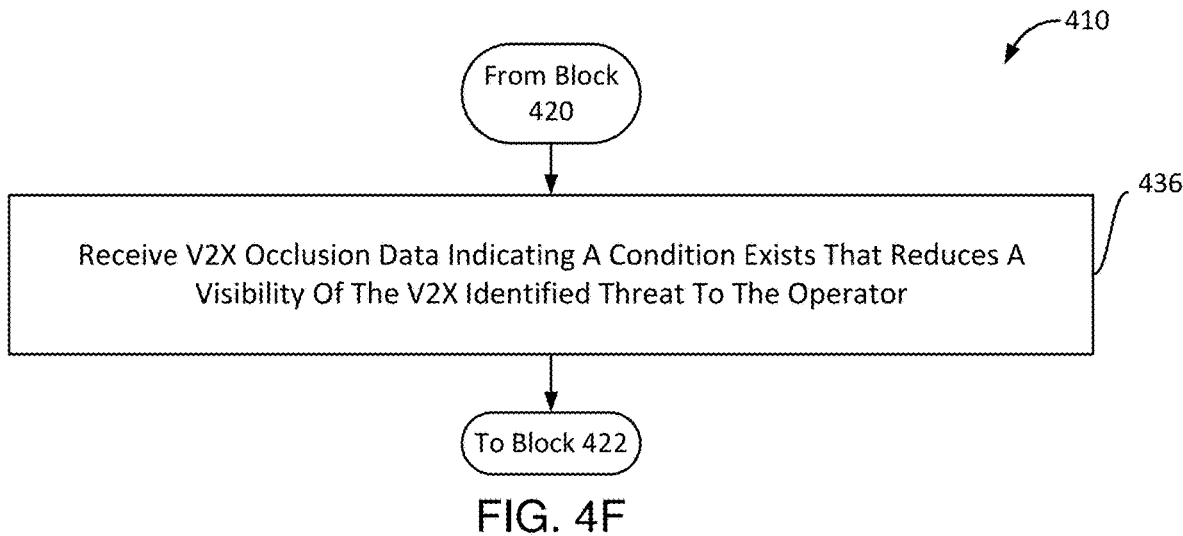

FIG. 4F illustrates operations 410 that may be performed by the processing system in some embodiments. With reference to FIGS. 1-4F, after receiving the V2X communication in block 420, the processing system may receive V2X occlusion data indicating a condition exists that reduces a visibility of the V2X-identified threat to the operator in block 436. For example, in block 436 the processing system may receive information regarding weather conditions that may make it difficult for the operator to see (e.g., darkness, fog, rain, snow, smog, etc.), obstructions nearby (e.g., one or more other vehicles, objects, structures, creatures), etc. Such conditions and/or elements may be considered occlusions if they partially or complete block and/or hinder the operator's view. Means for performing the operations of block 436 include the processing system(s) 164, 240, 270, 300, 350, the memory 166, the input module 168, the output module 170, the radio module 172, the operator perception assessment module 316, and the vehicle safety and crash avoidance module 352. Following the operations in block 436, the processing system may perform the operations in block 422 of the method 400 as described.

Figure 4G:
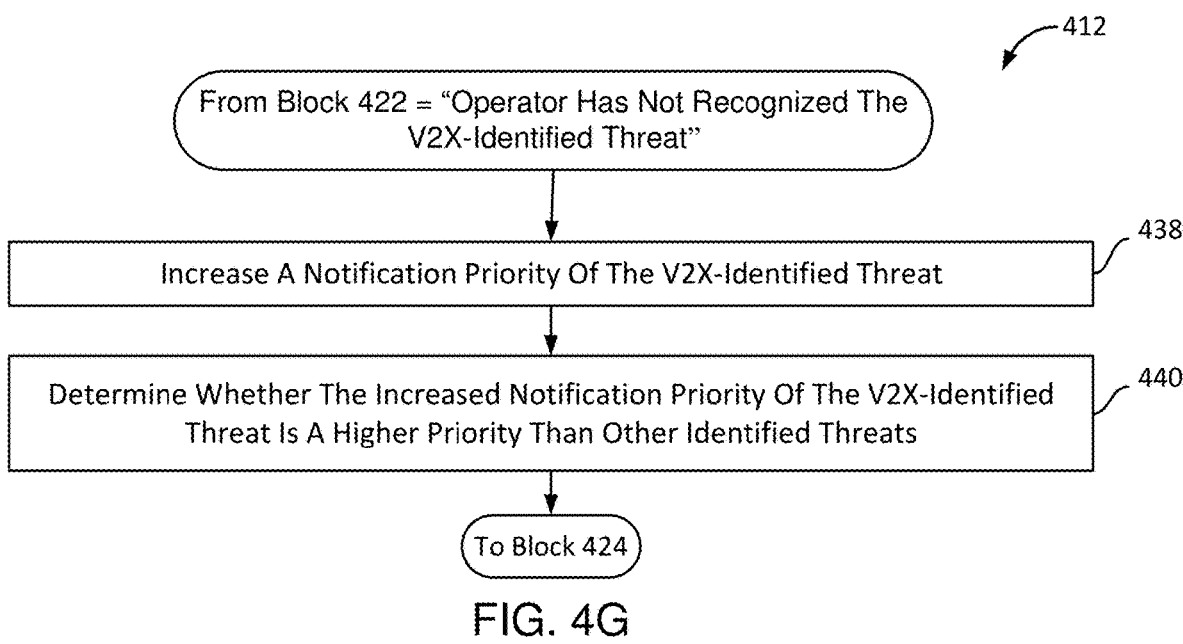

FIG. 4G illustrates operations 412 that may be performed by the processing system in some embodiments. With reference to FIGS. 1-4G, the processing system may perform operations for increasing a notification priority of the V2X-identified threat in response to determining that the vehicle operator has not recognized the V2X-identified threat. In response to the processing system determining that the vehicle operator has not recognized the V2X-identified threat in block 422 of the method 400, the processing system may increase a notification priority of the V2X-identified threat in response to determining that the vehicle operator has not recognized the V2X-identified threat in block 438. For example, the processing system may determine a current direction of the operator's gaze is not in the direction of the V2X-identified threat, which implies the operator has not recognized the threat. As another example, the processing system may observe no change in the operator's pupils (e.g., dilation) or no change is facial movements or expression, which may imply the operator has not recognized the threat. As noted above, the processing system may receive information from a variety of sensors of the vehicle and/or information in the V2X communications. In some embodiments, the threat assessment module 314 or other vehicle system may maintain a ranking for various threats to the vehicle or a vehicle occupant, in order to provide a hierarchy for notifications regarding those threats. In this way, the ranking of various threats may be adjusted (i.e., increased or decreased) depending on the whether the operator has acknowledged the threat. Means for performing the operations of block 438 include the processing system(s) 164, 240, 270, 300, 350, the memory 166, the input module 168, the output module 170, the radio module 172, the threat assessment module 314, and the vehicle safety and crash avoidance module 352.

In block 440, the processing system may determine whether the increased notification priority of the V2X-identified threat is a higher priority than other identified threats. For example, although a particular V2X-identified threat might normally have a relatively low risk ranking, since the vehicle operator has not acknowledged that threat, that low risk ranking may increase, becoming a higher ranked risk than other risks that previously had a higher rank. In such a case, the processing system may determine that the increased notification priority of the V2X-identified threat is a higher priority than other identified threats. Means for performing the operations of block 430 include the processing system(s) 164, 240, 270, 300, 350, the memory 166, the input module 168, the output module 170, the radio module 172, the threat assessment module 314, and the vehicle safety and crash avoidance module 352.

Following the operations in block 440, the processing system may perform the operations in block 424 to identify a display location, and in block 426 to generate an alert regarding the V2X-identified threat of the method 400 as described. In particular, the processing system may generate an alert in block 426 that includes the increased notification priority V2X-identified threat but excludes information regarding other lower priority identified threats as described. Also, the processing system may present the alert in only a single display location (vs. multiple redundant renderings of the alert).

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a processing system of V2X onboard equipment including a processor configured with processor-executable instructions to perform operations of the methods of the following implementation examples; the example methods discussed in the following paragraphs implemented by a processing system of V2X onboard equipment including means for performing functions of the methods of the following implementation examples; and the example methods discussed in the following paragraphs may be implemented as a non-transitory processor-readable storage medium having stored thereon processor-executable instructions configured to cause a by a processing system of V2X onboard equipment to perform the operations of the methods of the following implementation examples.

Example 1. A method performed by a processor of a vehicle for presenting relevant warnings to a vehicle operator, including receiving a V2X communication including information regarding a V2X-identified threat to the vehicle or a vehicle occupant; determining whether the vehicle operator has recognized the V2X-identified threat; determining a display location that is most likely to receive the vehicle operator's attention in response to determining that the vehicle operator has not recognized the V2X-identified threat; and generating an alert regarding the V2X-identified threat on the determined display location.

Example 2. The method of example 1, further including in which generating the alert regarding the V2X-identified threat on the determined display location comprises generating a display that excludes alerts regarding any threat conditions that the vehicle operator has recognized.

Example 3. The method of either of examples 1 or 2, further including determining a location of a region outside the vehicle containing the V2X-identified threat, and determining a direction of the vehicle operator's gaze, in which determining whether the vehicle operator has recognized the V2X-identified threat includes determining that the vehicle operator has not recognized the V2X-identified threat in response to determining that the location of the region outside the vehicle containing the V2X-identified threat is not within the field of view of the vehicle operator in the determined direction of the vehicle operator's gaze.

Example 4. The method of any of examples 1-3, further including determining a location of a region outside the vehicle containing the V2X-identified threat, and determining whether the location of the region outside the vehicle containing the V2X-identified threat is in a recognized blind spot of the vehicle operator, in which determining whether the vehicle operator has recognized the V2X-identified threat includes determining that the vehicle operator has not recognized the V2X-identified threat in response to determining that the location of the region outside the vehicle containing the V2X-identified threat is in the recognized blind spot of the vehicle operator.

Example 5. The method of any of examples 1-4, further including determining a direction of the vehicle operator's gaze, in which determining the display location that is most likely to receive the vehicle operator's attention includes determining identifying a display location that is visible within a field of view of the vehicle operator in the determined direction of the vehicle operator's gaze.

Example 6. The method of any of examples 1-5, in which determining the display location that is most likely to receive the vehicle operator's attention includes determining which of a plurality of vehicle displays is designated as a preferred display for V2X-identified threats.

Example 7. The method of any of examples 1-6, further including determining whether a threat acknowledgement has been received from the vehicle operator with respect to the V2X-identified threat, in which determining whether the vehicle operator has recognized the V2X-identified threat includes determining that the vehicle operator has not recognized the V2X-identified threat in response to determining that no threat acknowledgement has been received from the vehicle operator with respect to the V2X-identified threat.

Example 8. The method of any of examples 1-7, further including receiving V2X occlusion data indicating a condition exists that reduces a visibility of the V2X-identified threat to the vehicle operator, in which determining whether the vehicle operator has recognized the V2X-identified threat includes determining that the vehicle operator has not recognized the V2X-identified threat in response to receiving the V2X occlusion data.

Example 9. The method of any of examples 1-8, further including increasing a notification priority of the V2X-identified threat in response to determining that the vehicle operator has not recognized the V2X-identified threat, and determining whether the increased notification priority of the V2X-identified threat is a higher priority than other identified threats, in which generating the alert regarding the V2X-identified threat on the determined display location includes generating the alert regarding the V2X-identified threat but excluding alerts regarding other identified threats on the determined display location in response to determining that the increased notification priority of the V2X-identified threat is higher priority than other identified threats.

Example 10. The method of any of examples 1-9, in which the V2X communication including the information regarding the V2X-identified threat is received from a source remote from the vehicle.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle for presenting relevant warnings to a vehicle operator, comprising:
   receiving a vehicle-to-everything (V2X) communication including information regarding a V2X-identified threat;
   determining whether the vehicle operator has recognized the V2X-identified threat;
   determining a display location that is most likely to receive the vehicle operator's attention in response to determining that the vehicle operator has not recognized the V2X-identified threat, wherein the determined display location changes to move the alert message from one display to another to follow movement of the operator's eyes or head; and
   generating an alert regarding the V2X-identified threat on the determined display location, which changes to follow the movement of the operator's eyes or head.

2. The method of claim 1, wherein generating the alert regarding the V2X-identified threat on the determined display location comprises generating a display that excludes alerts regarding any threat conditions that the vehicle operator has recognized.

3. The method of claim 1, further comprising:
   determining a location of a region outside the vehicle containing the V2X-identified threat; and
   determining a direction of the vehicle operator's gaze, wherein determining whether the vehicle operator has recognized the V2X-identified threat comprises determining that the vehicle operator has not recognized the V2X-identified threat in response to determining that the location of the region outside the vehicle containing the V2X-identified threat is not within a field of view of the vehicle operator in the determined direction of the vehicle operator's gaze.

4. The method of claim 1, further comprising:
determining a location of a region outside the vehicle containing the V2X-identified threat; and
determining whether the location of the region outside the vehicle containing the V2X-identified threat is in a recognized blind spot of the vehicle operator,
wherein determining whether the vehicle operator has recognized the V2X-identified threat comprises determining that the vehicle operator has not recognized the V2X-identified threat in response to determining that the location of the region outside the vehicle containing the V2X-identified threat is in the recognized blind spot of the vehicle operator.

5. The method of claim 1, further comprising determining a direction of the vehicle operator's gaze, wherein determining the display location that is most likely to receive the vehicle operator's attention comprises identifying a display location that is visible within a field of view of the vehicle operator in the determined direction of the vehicle operator's gaze.

6. The method of claim 1, wherein determining the display location that is most likely to receive the vehicle operator's attention comprises determining which of a plurality of vehicle displays is designated as a preferred display for V2X-identified threats.

7. The method of claim 1, further comprising determining whether a threat acknowledgement has been received from the vehicle operator with respect to the V2X-identified threat,
wherein determining whether the vehicle operator has recognized the V2X-identified threat comprises determining that the vehicle operator has not recognized the V2X-identified threat in response to determining that no threat acknowledgement has been received from the vehicle operator with respect to the V2X-identified threat.

8. The method of claim 1, further comprising:
receiving V2X occlusion data indicating a condition exists that reduces a visibility of the V2X-identified threat to the vehicle operator,
wherein determining whether the vehicle operator has recognized the V2X-identified threat comprises determining that the vehicle operator has not recognized the V2X-identified threat in response to receiving the V2X occlusion data.

9. The method of claim 1, further comprising:
increasing a notification priority of the V2X-identified threat in response to determining that the vehicle operator has not recognized the V2X-identified threat; and
determining whether the increased notification priority of the V2X-identified threat is a higher priority than other identified threats,
wherein generating the alert regarding the V2X-identified threat on the determined display location comprises generating the alert regarding the V2X-identified threat but excluding alerts regarding other identified threats on the determined display location in response to determining that the increased notification priority of the V2X-identified threat is higher priority than other identified threats.

10. The method of claim 1, wherein the V2X communication including the information regarding the V2X-identified threat is received from a source remote from the vehicle.

11. A vehicle, comprising:
a radio module; and
a processor coupled to the radio module, wherein the processor is configured with processor-executable instructions to:
receive a vehicle-to-everything (V2X) communication including information regarding a V2X-identified threat;
determine whether a vehicle operator has recognized the V2X-identified threat;
determine a display location that is most likely to receive the vehicle operator's attention in response to determining that the vehicle operator has not recognized the V2X-identified threat, wherein the determined display location changes to move the alert message from one display to another to follow movement of the operator's eyes or head; and
generate an alert regarding the V2X-identified threat on the determined display location, which changes to follow the movement of the operator's eyes or head.

12. The vehicle of claim 11, wherein the processor is further configured with processor-executable instructions to generate the alert regarding the V2X-identified threat on the determined display location that excludes alerts regarding any threat conditions that the processor has determine that the vehicle operator has recognized.

13. The vehicle of claim 11, wherein the processor is further configured with processor-executable instructions to:
determine a location of a region outside the vehicle containing the V2X-identified threat; and
determine a direction of the vehicle operator's gaze,
wherein the processor is further configured with processor-executable instructions to determine that the vehicle operator has not recognized the V2X-identified threat in response to determining that the location of the region outside the vehicle containing the V2X-identified threat is not within a field of view of the vehicle operator in the determined direction of the vehicle operator's gaze.

14. The vehicle of claim 11, wherein the processor is further configured with processor-executable instructions to:
determine a location of a region outside the vehicle containing the V2X-identified threat; and
determine whether the location of the region outside the vehicle containing the V2X-identified threat is in a recognized blind spot of the vehicle operator,
wherein the processor is further configured with processor-executable instructions to determine that the vehicle operator has not recognized the V2X-identified threat in response to determining that the location of the region outside the vehicle containing the V2X-identified threat is in the recognized blind spot of the vehicle operator.

15. The vehicle of claim 11, wherein the processor is further configured with processor-executable instructions to determine a direction of the vehicle operator's gaze,
wherein the processor is further configured with processor-executable instructions to determine the display location that is most likely to receive the vehicle operator's attention by determining a display location that is visible within a field of view of the vehicle operator in the determined direction of the vehicle operator's gaze.

16. The vehicle of claim 11, wherein the processor is further configured with processor-executable instructions to determine the display location that is most likely to receive the vehicle operator's attention by determining which of a plurality of vehicle displays is designated as a preferred display for V2X-identified threats.

17. The vehicle of claim 11, wherein the processor is further configured with processor-executable instructions to determine whether a threat acknowledgement has been received from the vehicle operator with respect to the V2X-identified threat,
wherein the processor is further configured with processor-executable instructions to determine that the vehicle operator has not recognized the V2X-identified threat in response to determining that no threat acknowledgement has been received from the vehicle operator with respect to the V2X-identified threat.

18. The vehicle of claim 11, wherein the processor is further configured with processor-executable instructions to:
receive V2X occlusion data indicating a condition exists that reduces a visibility of the V2X-identified threat to the vehicle operator, wherein the processor is further configured with processor-executable instructions to determine that the vehicle operator has not recognized the V2X-identified threat in response to receiving the V2X occlusion data.

19. The vehicle of claim 11, wherein the processor is further configured with processor-executable instructions to:
increase a notification priority of the V2X-identified threat in response to determining that the vehicle operator has not recognized the V2X-identified threat; and
determine whether the increased notification priority of the V2X-identified threat is a higher priority than other identified threats,
wherein the processor is further configured with processor-executable instructions to generate the alert regarding the V2X-identified threat on the determined display location by generating the alert regarding the V2X-identified threat but excluding alerts regarding other identified threats on the determined display location in response to determining that the increased notification priority of the V2X-identified threat is higher priority than other identified threats.

20. The vehicle of claim 11, wherein the processor is further configured with processor-executable instructions to receive the information regarding the V2X-identified threat from a source remote from the vehicle.

21. A vehicle, comprising:
means for receiving a vehicle-to-everything (V2X) communication including information regarding a V2X-identified threat;
means for determining whether a vehicle operator has recognized the V2X-identified threat;
means for determining a display location that is most likely to receive the vehicle operator's attention in response to determining that the vehicle operator has not recognized the V2X-identified threat, wherein the determined display location changes to move the alert message from one display to another to follow movement of the operator's eyes or head; and
means for generating an alert regarding the V2X-identified threat on the determined display location, which changes to follow the movement of the operator's eyes or head.

22. The vehicle of claim 21, wherein means for generating an alert regarding the V2X-identified threat on the determined display location comprises means for generating a display that excludes alerts regarding any threat conditions that the vehicle operator has recognized.

23. The vehicle of claim 21, further comprising:
means for determining a location of a region outside the vehicle containing the V2X-identified threat; and
means for determining a direction of the vehicle operator's gaze,
wherein means for determining whether the vehicle operator has recognized the V2X-identified threat comprises means for determining that the vehicle operator has not recognized the V2X-identified threat in response to determining that the location of the region outside the vehicle containing the V2X-identified threat is not within a field of view of the vehicle operator in the determined direction of the vehicle operator's gaze.

24. The vehicle of claim 21, further comprising:
means for determining a location of a region outside the vehicle containing the V2X-identified threat; and
means for determining whether the location of the region outside the vehicle containing the V2X-identified threat is in a recognized blind spot of the vehicle operator,
wherein means for determining whether the vehicle operator has recognized the V2X-identified threat comprises means for determining that the vehicle operator has not recognized the V2X-identified threat in response to determining that the location of the region outside the vehicle containing the V2X-identified threat is in the recognized blind spot of the vehicle operator.

25. The vehicle of claim 21, further comprising means for determining a direction of the vehicle operator's gaze, wherein means for determining the display location that is most likely to receive the vehicle operator's attention comprises means for determining a display location that is visible within a field of view of the vehicle operator in the determined direction of the vehicle operator's gaze.

26. The vehicle of claim 21, further comprising means for determining whether a threat acknowledgement has been received from the vehicle operator with respect to the V2X-identified threat, wherein means for determining whether the vehicle operator has recognized the V2X-identified threat comprises means for determining that the vehicle operator has not recognized the V2X-identified threat in response to determining that no threat acknowledgement has been received from the vehicle operator with respect to the V2X-identified threat.

27. The vehicle of claim 21, further comprising:
means for receiving V2X occlusion data indicating a condition exists that reduces a visibility of the V2X-identified threat to the vehicle operator,
wherein means for determining whether the vehicle operator has recognized the V2X-identified threat comprises means for determining that the vehicle operator has not recognized the V2X-identified threat in response to receiving the V2X occlusion data.

28. The vehicle of claim 21, further comprising:
means for increasing a notification priority of the V2X-identified threat in response to determining that the vehicle operator has not recognized the V2X-identified threat; and
means for determining whether the increased notification priority of the V2X-identified threat is a higher priority than other identified threats,
wherein means for generating the alert regarding the V2X-identified threat on the determined display location comprises means for generating the alert regarding the V2X-identified threat but excluding alerts regarding other identified threats on the determined display location in response to determining that the increased notification priority of the V2X-identified threat is the higher priority than other identified threats.

29. A non-transitory processor-readable medium having stored thereon processor-executable instructions configured to cause a processor of a vehicle to perform operations comprising:

receiving a vehicle-to-everything (V2X) communication including information regarding a V2X-identified threat;

determining whether a vehicle operator has not recognized the V2X-identified threat;

determining a display location that is most likely to receive the vehicle operator's attention in response to determining that the vehicle operator has not recognized the V2X-identified threat, wherein the determined display location changes to move the alert message from one display to another to follow movement of the operator's eyes or head; and generating an alert regarding the V2X-identified threat on the determined display location, which changes to follow the movement of the operator's eyes or head.

30. The non-transitory processor-readable medium of claim 29, wherein the stored processor-executable instructions are configured to cause a processor of a vehicle to perform operations such that generating the alert regarding the V2X-identified threat on the determined display location comprises generating a display that excludes alerts regarding any threat conditions that the vehicle operator has recognized.

* * * * *